(12) United States Patent (10) Patent No.: US 11,246,413 B2
Hiorth et al. (45) Date of Patent: Feb. 15, 2022

(54) FURNITURE BASE AND A PIECE OF FURNITURE COMPRISING SUCH A FURNITURE BASE

(71) Applicants: Nikolai Hiorth, Oslo (NO); Morten Berge, Oslo (NO)

(72) Inventors: Nikolai Hiorth, Oslo (NO); Morten Berge, Oslo (NO)

(*) Notice: Subject to any disclaimer, the term of this patent is extended or adjusted under 35 U.S.C. 154(b) by 237 days.

(21) Appl. No.: 16/620,537

(22) PCT Filed: Jun. 8, 2018

(86) PCT No.: PCT/IB2018/054150
§ 371 (c)(1),
(2) Date: Dec. 9, 2019

(87) PCT Pub. No.: WO2018/225025
PCT Pub. Date: Dec. 13, 2018

(65) Prior Publication Data
US 2021/0321768 A1 Oct. 21, 2021

(30) Foreign Application Priority Data
Jun. 9, 2017 (NO) .................................. 20170943

(51) Int. Cl.
*A47B 91/00* (2006.01)
*B60B 33/06* (2006.01)

(52) U.S. Cl.
CPC .......... *A47B 91/005* (2013.01); *A47B 91/002* (2013.01); *B60B 33/066* (2013.01); *B60B 2200/20* (2013.01)

(58) Field of Classification Search
CPC combination set(s) only.
See application file for complete search history.

(56) References Cited

U.S. PATENT DOCUMENTS 3,633,242 A * 1/1972 Wasofsky ............... B60B 33/06
16/34
4,828,208 A * 5/1989 Peterson .................. A47B 9/00
108/147
(Continued)

FOREIGN PATENT DOCUMENTS

FR 2366917 A 5/1976
GB 624303 A 6/1949

*Primary Examiner* — Monica E Millner
(74) *Attorney, Agent, or Firm* — Christian D. Abel

(57) ABSTRACT

A furniture base (10) is disclosed comprising a frame structure (12) and an actuator device (33) that is rotatably supported in the frame structure about a rotational axis. The furniture base (10) further comprises a plurality of wheel units (76, 77, 78, 79) that are movably attached to the frame structure (12) between an upper position and lower position relative to the frame structure (12). The wheel units (76, 77, 78, 79) are connected to the actuator device (33) for movement of the wheel unit (76, 77, 78, 79) between the upper and lower position. The furniture base (10) further comprises a locking mechanism (46) for locking of the wheel units (76, 77, 78, 79) in the lower position of the wheel units (76, 77, 78, 79). The locking mechanism (46) comprises a guide pin (47) that projects out from the actuator device (33) and is attached to the actuator device (33) swingably relative to the actuator device (33). The furniture base (10) further comprises a guide device (53) that guides the movement of the guide pin (47) when the actuator device (33) is rotated for movement of the wheel units (76, 77, 78, 79) between the upper and lower positions of the wheel units (76, 77, 78, 79).

28 Claims, 18 Drawing Sheets

(56) References Cited

U.S. PATENT DOCUMENTS

| | | | | |
|---|---|---|---|---|
| 4,874,182 A * | 10/1989 | Clark | ............ | B62B 7/12 |
| | | | | 280/30 |
| 5,586,803 A * | 12/1996 | Overpeck | ............ | A47B 83/02 |
| | | | | 297/158.3 |
| 9,192,266 B2 * | 11/2015 | Starr | ............ | A47J 47/16 |
| 2009/0174162 A1 * | 7/2009 | Gass | ............ | B60B 33/06 |
| | | | | 280/79.11 |
| 2012/0024329 A1 * | 2/2012 | Ma | ............ | B62B 3/02 |
| | | | | 135/16 |
| 2012/0025050 A1 * | 2/2012 | Ma | ............ | E04H 12/2238 |
| | | | | 248/346.01 |
| 2014/0190294 A1 | 7/2014 | Ma | | |
| 2017/0114563 A1 | 4/2017 | He | | |

\* cited by examiner

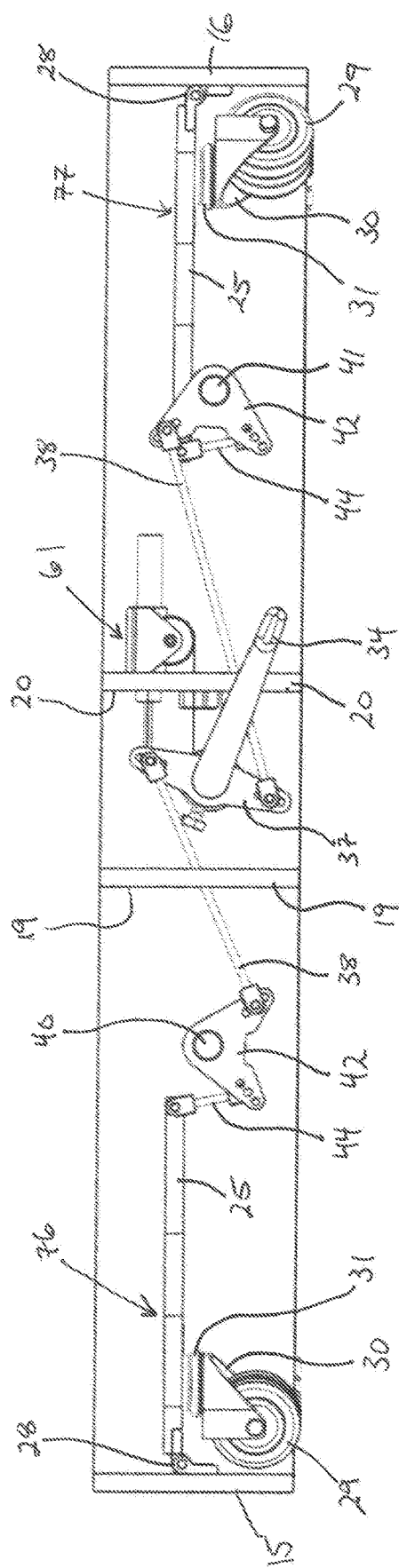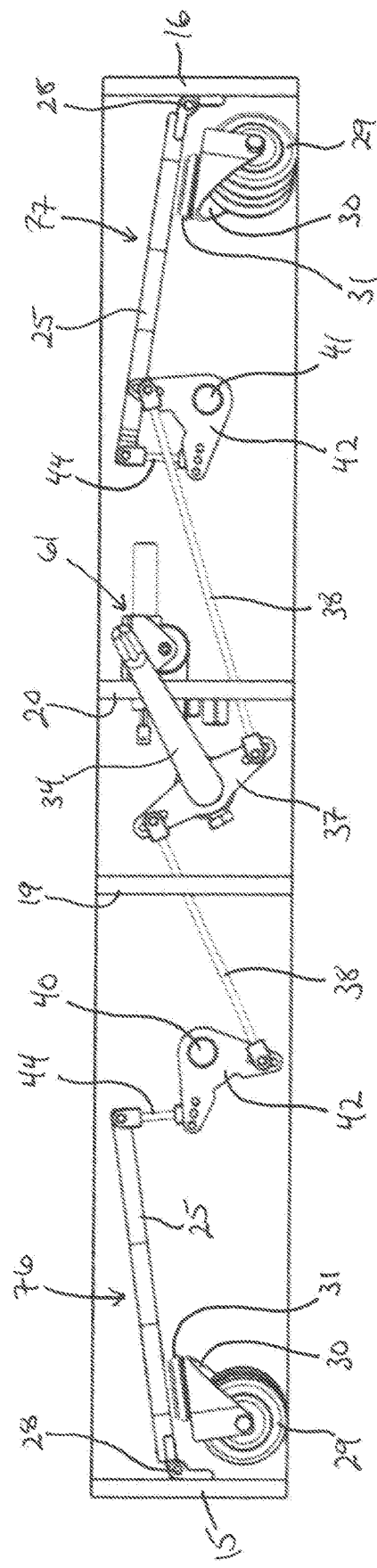
Fig. 3
Fig. 4

FURNITURE BASE AND A PIECE OF FURNITURE COMPRISING SUCH A FURNITURE BASE

The present application is related to a furniture base that at regular intervals needs to be moved from one place to another, and a piece of furniture comprising such a furniture base.

Often it is desirable to move a piece of furniture. If the piece of furniture is heavy and/or big and unwieldy for a person, it will quickly become a major task to do this. Some pieces of furniture are therefore provided with wheels to facilitate the process of moving the piece of furniture.

From the publication US 2014/0190294 A1 an undercarriage for a sunshade is known that is equipped with four wheels that can be lifted and lowered. The device for lifting and lowering the wheels comprises a pedal that is attached to a transversal rod that in each end is connected to a rod, which are arranged in respective guiding elements, with a complicated mechanism that transfers a rotational motion of the transverse rod, caused by a person that treads down the pedal, is converted to a linear motion of the rods. Each rod further comprises a pin that is spring biasedly arranged in the in the rod and projects down from the rod. Each rod further comprises a rotatable plate that is provided with guiding elements and different vertical levels for the pin to guide the movements of the pin as the rods are moved to and fro. This device is complicated and elaborate to produce. Since the mechanism comprises many parts that move relative to each other, the chances are considerably increased that it will function worse since the movable parts may get stuck. The possibility that the mechanism break down after a while is also much larger when it consists of many movable parts.

The object of the present invention is therefore to provide a device that can be used with furniture, particularly with heavy and/or unwieldy furniture, to make it easy to move the furniture.

It has also been an object to provide the device with simple technical solutions that reduce the chances that a technical failure of the device will occur.

It has further been an object to achieve a controlled movement of the furniture base and the piece of furniture, particularly when the piece of furniture is heavy.

These objects are achieved with a furniture base as defined in claim 1 and a piece of furniture as defined in claim 13. Further embodiments of the furniture base and the piece of furniture are defined in the dependent claims 2-12 and 14-15.

Thus, a furniture base is provided comprising a frame structure and an actuator device that is rotatably supported in the frame structure about a rotational axis. The furniture base further comprises a plurality of wheel units that are movably attached to the frame structure between an upper position and lower position relative to the frame structure. The wheel units are connected to the actuator device for movement of the wheel unit between the upper and lower position. The furniture base also comprises a locking mechanism for locking of the wheel units in the lower position of the wheel units. The locking mechanism comprises a guide pin that projects out from the actuator device and is attached to the actuator device swingably relative to the actuator device. The furniture base further comprises a guide device that guides the movement of the guide pin when the actuator device is rotated for movement of the wheel units between the upper and lower positions of the wheel units.

The wheel units are preferably rotatably attached to the frame structure of the furniture base, for example with the help of a hinge device or possibly another type of device that provides the wheels with the possibility for rotational attachment to the frame structure.

The wheel units are preferably mechanically connected to the actuator device. Every wheel unit may be connected to the actuator device with at least one tension rod such that a rotation of the actuator device will move the wheel units between the lower position where the wheel units projects out below the lower edge of the frame structure, and the upper position where the wheel units are pulled up into the frame structure. In an embodiment, a first rod and a second rod may be used for each wheel unit, where the first rod and the second rod are connected via an intermediate shaft.

The actuator device may comprise a rod that is supported in the frame structure such that the rod is rotatable, for example in that the rod supported by suitable bearings.

The actuator device preferably also comprises an actuator element for rotation of the actuator device. The actuator device further preferably comprises an actuator element that is detachably attached to the actuator device. The actuator element may thereby be detached when there is no need to move the piece of furniture that the furniture base is a part of.

The guide pin is preferably swingably mounted to the actuator device in a plane that is substantially parallel to the rotational axis of the actuator device.

The actuator device may be formed with one or more holes in longitudinal axial direction that may be completely or partially through-going. Alternatively the actuator device may be designed solidly, i.e. that the actuator device is formed without holes in its longitudinal direction.

The actuator device preferably further comprises a through-going attachment opening in which the guide pin is swingably mounted. The attachment opening preferably has an oblong shape with the largest extension, i.e. the longest diameter, in the axial direction of the actuation device. That means that the attachment opening is not circularly shaped, but that the attachment opening has a radial extension in the axial direction of the actuator device that is larger than the radial extension of the attachment opening in a direction that is perpendicular to the axial direction of the actuator device.

The attachment opening further preferably has a larger extension in the axial direction of the actuator device on the side of the actuator device that faces the guide device than on the opposite side of the actuator device.

If the actuator device is formed without holes in the axial direction that extend beyond the attachment opening, the attachment opening is preferably also formed with smooth and straight side faces through the actuator device with a decreasing distance between opposite sides in the axial direction of the attachment opening from the opening of the attachment opening that faces the guide device and towards the opening of the attachment opening on the opposite side of the actuator device relative to the guide device. This means that the attachment opening will have an oblong conical shape (with a cut-off top) in a vertical axial section through the actuator device when the longitudinal axis of the attachment opening lie horizontally. The guide pin may be swingably supported in one or both of the two openings of the attachment opening.

As mentioned above, the actuator device may be formed completely or partly hollow where the actuator device is formed with at least with a hole that extends from an end of the actuator device and at least past the attachment opening. The through-going opening attachment opening for the guide pin of the actuator device as described above, then in practice comprises two oblong holes in the axial direction of the actuator device, one oblong hole that extends from outside the outer side of the actuator device that faces the guide device and into the axial hole in the actuator device, and a hole that extends from the outside of the opposite side of the actuator device relative to the guide device and into the axial hole of the actuator device.

The oblong hole of the actuator device that faces the guide device preferably has a larger extension in the axial direction of the actuator device than the oblong hole of the actuator device on the opposite side of the actuator device relative to the guide device, in a similar way as explained above. The guide pin is swingably supported in at least one the two holes, but is preferably swingably supported in both holes.

The guide pin is therefore swingable about an axis that forms an angle with the rotational axis of the actuator device that is at least greater than 0 degrees, and which is preferably about 90 degrees.

The locking mechanism preferably comprises a spring device that is arranged in the attachment opening and that is biased to bring the guide pin to a starting position. The spring device may be bipartite where each of the parts of the spring device extends from the actuator device and out along the guide pin in each direction from the actuator device to respectively a guide pin head on the guide pin in one end of the guide pin and an adjustment screw that is provided on the guide pin at the opposite side of the actuator device. The two spring devices preferably abut the actuator device and against the guide pin head and the adjustment nut, but may alternatively be attached to the actuator device and/or the guide pin head and/or the adjustment nut.

The spring device may alternatively extend between a first end portion of the guide pin where it abuts the head of the guide pin, and the adjustment screw that is provided on the guide pin, preferably in vicinity of the other end portion of the guide pin such that the spring device extend through the attachment opening.

The spring device will thus act on the guide pin with a force that seeks to bring the guide pin back to the guide pin's position of equilibrium when the guide pin is moved away from the position of equilibrium. The guide pin is spring biased in both swinging directions about the position of equilibrium, i.e. the guide pin swings back and forth substantially in a plane and is moved up and down when the actuator device is given a rotational movement. The position of equilibrium is therefore the position that the guide pin places itself when it is not acted upon by external forces from the spring device and the guide device.

The guide device preferably also comprises a first guide element that is provided with a locking portion. When the guide pin engages with the locking portion, the guide pin is locked for further movement. Thereby the wheel units are locked in their respective lower positions.

The guide device further comprises a guide element to ensure that the guide pin is guided into engagement with the locking portion when the actuator device is rotated in order to move the wheel units to their lower positions.

The first guide element and the second guide element of the guide device are preferably securely attached to the frame structure. Alternatively, the first guide element and the second guide element may be attached to a plate element where the plate element is attached to the frame structure. A further alternative is to form the first guide element, the second guide element and the plate element in an integral unit that is attached to the frame structure.

Since the piece of furniture may be heavy, it may be difficult, and maybe impossible in certain cases, to control the movement of the furniture base downward as the wheel units are moved from their lower positions to the upper positions. It is therefore a risk that the furniture base and the piece of furniture hit the ground hard and are damaged. Therefore the furniture base preferably further comprises a damping device for damping of the movement of the furniture base, and the piece of furniture, as the wheels move from their respective lower positions to their respective upper positions.

In an embodiment of the furniture base, the damping device is preferably attached to the actuator device and to the frame structure. The damping mechanism may for example comprise a piston/cylinder damper in order to provide the damping effect.

The damping mechanism preferably comprises a damping device comprising a piston element that is arranged in a cylinder part that is attached to the frame structure, where the piston element is connected to the actuator device with at least one wire.

The damping device may also comprise an attachment part that is attached to the piston element, and two wires that are both attached to the attachment part and the actuator device and that run over respective wire pulleys that are attached to the first damper device, preferably to a support element or to the cylinder part, or possibly to the frame structure.

There is further provided a piece of furniture that is movable over a surface, where the piece of furniture comprises a furniture base as described above.

The piece of furniture and the furniture base may be separate parts, i.e. they are formed as separate parts and thereafter mounted to each other.

Alternatively, the furniture base may be an integrated part of the piece of furniture, i.e. the piece of furniture is formed with an integrated base part at the lower part where wheel units, actuator device and the mechanism that connects the actuator device and the wheel units, the locking mechanism and possibly the damping mechanism is arranged.

As mentioned above, since the piece of furniture may be heavy, it can be difficult, and maybe impossible in some cases, to control the movement of the furniture base downwards as the wheel units are moved from their lower positions to their upper positions. It is therefore a risk that the furniture base and the furniture hits the ground hard and is damaged.

Thus, a furniture base is provided comprising a frame structure and an actuator device that is rotatably supported in the frame structure about a rotational axis. The furniture base further comprises a plurality of wheel units that are movably attached to the frame structure between an upper position and lower position relative to the frame structure. The wheel units are connected to the actuator device for movement of the wheel unit between the upper and lower position. The furniture base also comprises a locking mechanism for locking of the wheel units in the lower position of the wheel units. The locking mechanism comprises a guide pin that projects out from the actuator device and is attached to the actuator device swingably relative to the actuator device. The furniture base further comprises a damping mechanism for damping of the movement of the furniture base as the wheels move from their respective lower positions to their respective upper positions.

The wheel units are preferably rotatably attached to the frame structure of the furniture base, for example with the help of a hinge device or possibly another type of device that provides the wheels with the possibility for rotational attachment to the frame structure.

The wheel units are preferably mechanically connected to the actuator device. Every wheel unit may be connected to the actuator device with at least one tension rod such that a rotation of the actuator device will move the wheel units between the lower position where the wheel units projects out below the lower edge of the frame structure, and the upper position where the wheel units are pulled up into the frame structure. In an embodiment, a first rod and a second rod may be used for each wheel unit, where the first rod and the second rod are connected via an intermediate shaft.

The actuator device may comprise a rod that is supported in the frame structure such that the rod is rotatable, for example in that the rod supported by suitable bearings. The actuator device preferably also comprises an actuator element for rotation of the actuator device. The actuator device further preferably comprises an actuator element that is detachably attached to the actuator device. The actuator element may thereby be detached when there is no need to move the piece of furniture that the furniture base is a part of.

In an embodiment of the furniture base, the damping device is preferably attached to the actuator device and to the frame structure. The damping mechanism may for example comprise a piston/cylinder damper in order to provide the damping effect.

The damping mechanism preferably comprises a damping device comprising a piston element that is arranged in a cylinder part that is attached to the frame structure, where the piston element is connected to the actuator device with at least one wire.

The damping device may also comprise an attachment part that is attached to the piston element, and two wires that are both attached to the attachment part and the actuator device and that run over respective wire pulleys that are attached to the first damper device, preferably to a support element or to the cylinder part, or possibly to the frame structure.

The furniture base preferably comprises a locking mechanism in order to lock the wheel units in the lower position of the wheel units, which locking mechanism comprises a guide pin that projects out from the actuator device and is attached to the actuator device swingable relative to the actuator device. Preferably, the furniture base further also comprises a guide device that guides the movement of the guide pin when the actuator device is rotated for movement of the wheel units between the upper and lower positions of the wheel units.

The actuator device is preferably rotatable about a rotational axis that is co-axial with the actuator's axis in the longitudinal direction. The guide pin is preferably swingably mounted to the actuator device in a plane that is substantially parallel to the rotational axis of the actuator device.

The actuator device may be formed with one or more holes in longitudinal axial direction that may be completely or partially through-going. Alternatively the actuator device may be designed solidly, i.e. that the actuator device is formed without holes in its longitudinal direction.

The actuator device preferably further comprises a through-going attachment opening in which the guide pin is swingably mounted. The attachment opening preferably has an oblong shape with the largest extension, i.e. the longest diameter, in the axial direction of the actuation device. That means that the attachment opening is not circularly shaped, but that the attachment opening has a radial extension in the axial direction of the actuator device that is larger than the radial extension of the attachment opening in a direction that is perpendicular to the axial direction of the actuator device.

The attachment opening further preferably has a larger extension in the axial direction of the actuator device on the side of the actuator device that faces the guide device than on the opposite side of the actuator device.

If the actuator device is formed without holes in the axial direction that extend beyond the attachment opening, the attachment opening is preferably also formed with smooth and straight side faces through the actuator device with a decreasing distance between opposite sides in the axial direction of the attachment opening from the opening of the attachment opening that faces the guide device and towards the opening of the attachment opening on the opposite side of the actuator device relative to the guide device. This means that the attachment opening will have an oblong conical shape (with a cut-off top) in a vertical axial section through the actuator device when the longitudinal axis of the attachment opening lie horizontally. The guide pin may be swingably supported in one or both of the two openings of the attachment opening.

As mentioned above, the actuator device may be formed completely or partly hollow where the actuator device is formed with at least with a hole that extends from an end of the actuator device and at least past the attachment opening. The through-going opening attachment opening for the guide pin of the actuator device as described above, then in practice comprises two oblong holes in the axial direction of the actuator device, one oblong hole that extends from outside the outer side of the actuator device that faces the guide device and into the axial hole in the actuator device, and a hole that extends from the outside of the opposite side of the actuator device relative to the guide device and into the axial hole of the actuator device.

The oblong hole of the actuator device that faces the guide device preferably has a larger extension in the axial direction of the actuator device than the oblong hole of the actuator device on the opposite side of the actuator device relative to the guide device, in a similar way as explained above. The guide pin is swingably supported in at least one the two holes, but is preferably swingably supported in both holes.

The guide pin is therefore swingable about an axis that forms an angle with the rotational axis of the actuator device that is at least greater than 0 degrees, and which is preferably about 90 degrees.

The locking mechanism preferably comprises a spring device that is arranged in the attachment opening and that is biased to bring the guide pin to a starting position. The spring device may be bipartite where each of the parts of the spring device extends from the actuator device and out along the guide pin in each direction from the actuator device to respectively a guide pin head on the guide pin in one end of the guide pin and an adjustment screw that is provided on the guide pin at the opposite side of the actuator device. The two spring devices preferably abut the actuator device and against the guide pin head and the adjustment nut, but may alternatively be attached to the actuator device and/or the guide pin head and/or the adjustment nut.

The spring device may alternatively extend between a first end portion of the guide pin where it abuts the head of the guide pin, and the adjustment screw that is provided on the guide pin, preferably in vicinity of the other end portion of the guide pin such that the spring device extend through the attachment opening.

The guide pin is therefore swingable about an axis that forms an angle with the rotational axis of the actuator device that is at least greater than 0 degrees, and which is preferably about 90 degrees.

The spring device will thus act on the guide pin with a force that seeks to bring the guide pin back to the guide pin's position of equilibrium when the guide pin is moved away from the position of equilibrium. The guide pin is spring biased in both swinging directions about the position of equilibrium, i.e. the guide pin swings back and forth substantially in a plane and is moved up and down when the actuator device is given a rotational movement. The position of equilibrium is therefore the position that the guide pin places itself when it is not acted upon by external forces from the spring device and the guide device.

The guide device preferably also comprises a first guide element that is provided with a locking portion. When the guide pin engages with the locking portion, the guide pin is locked for further movement. Thereby the wheel units are locked in their respective lower positions.

The guide device further comprises a guide element to ensure that the guide pin is guided into engagement with the locking portion when the actuator device is rotated in order to move the wheel units to their lower positions.

The first guide element and the second guide element of the guide device are preferably securely attached to the frame structure. Alternatively, the first guide element and the second guide element may be attached to a plate element where the plate element is attached to the frame structure. A further alternative is to form the first guide element, the second guide element and the plate element in an integral unit that is attached to the frame structure.

There is further provided a piece of furniture that is movable over a surface, where the piece of furniture comprises a furniture base as described above.

The piece of furniture and the furniture base may be separate parts, i.e. they are formed as separate parts and thereafter mounted to each other.

Alternatively, the furniture base may be an integrated part of the piece of furniture, i.e. the piece of furniture is formed with an integrated base part at the lower part where wheel units, actuator device and the mechanism that connects the actuator device and the wheel units, the locking mechanism and possibly the damping mechanism is arranged.

Other features and advantages of the invention will appear from the following description of non-limiting, preferred embodiments of the present invention, with reference to the figures, where FIG. 1 shows a piece of furniture arranged on a furniture base according to the present invention.

FIG. 3 shows the wheel units of a furniture base in a lower position.

FIG. 4 shows the wheel units of a furniture base in an upper position.

FIG. 8a-d shows the movement of the guide pin relative to the guide elements of the guide device when the actuator device is actuated two times.

Figure 9:
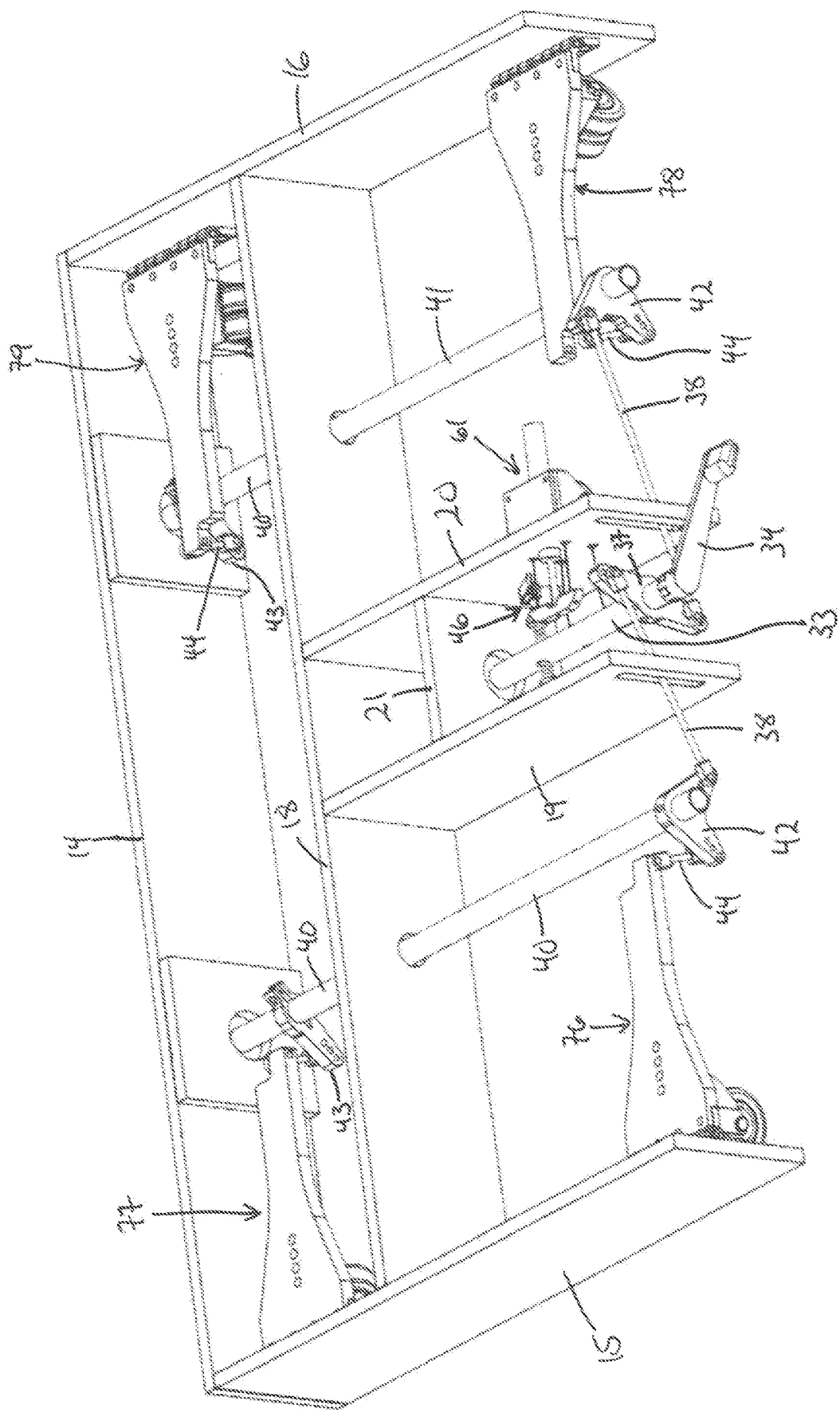

FIG. 9 shows an embodiment of the furniture base provided with a locking mechanism and a damping mechanism.

Figure 10:
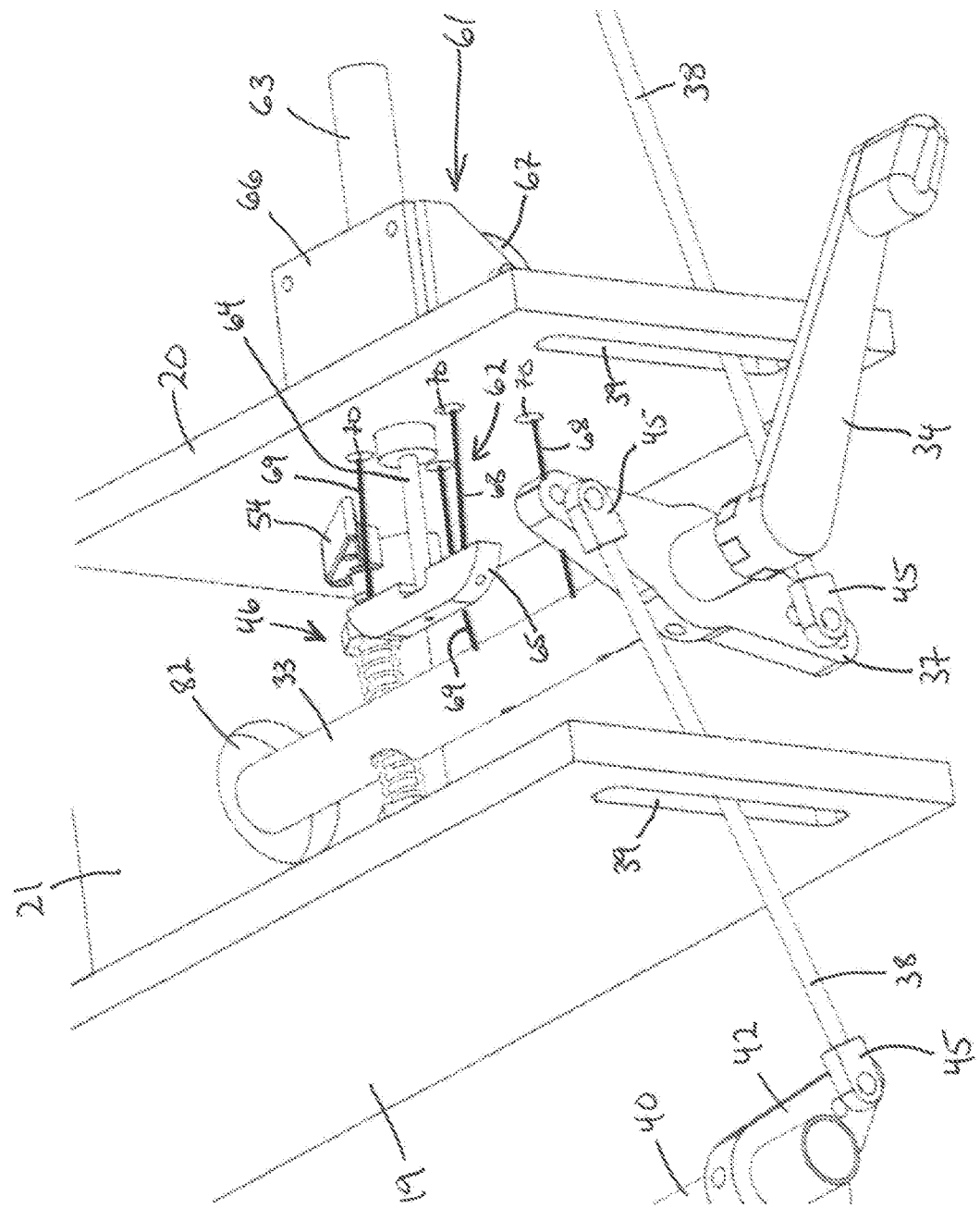

FIG. 10 shows an enlarged part of FIG. 9 that includes the locking mechanism and the damping mechanism.

Figure 11:
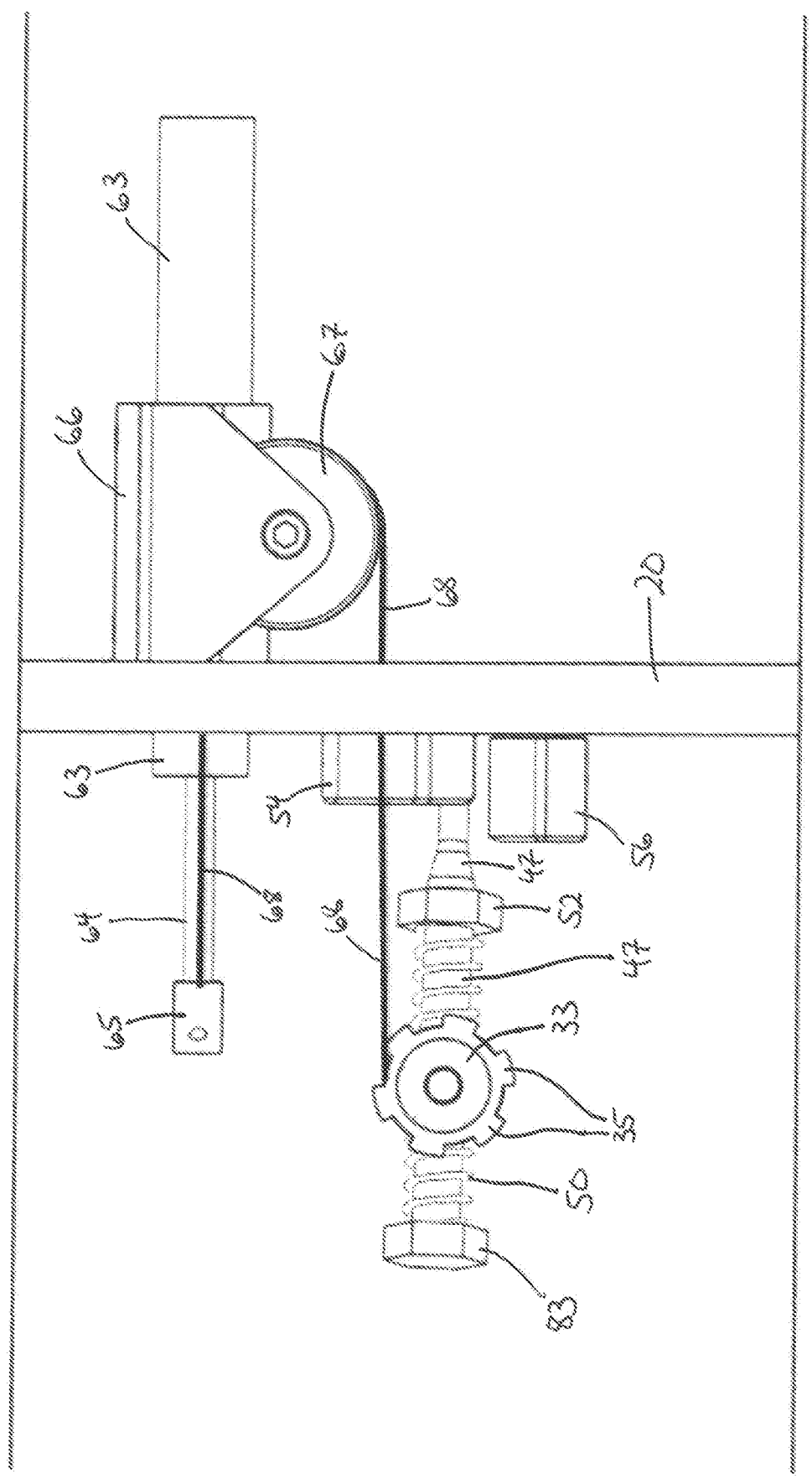

FIG. 11 shows a sideview of the locking mechanism and the damping mechanism in FIGS. 9 and 10.

Figure 12:
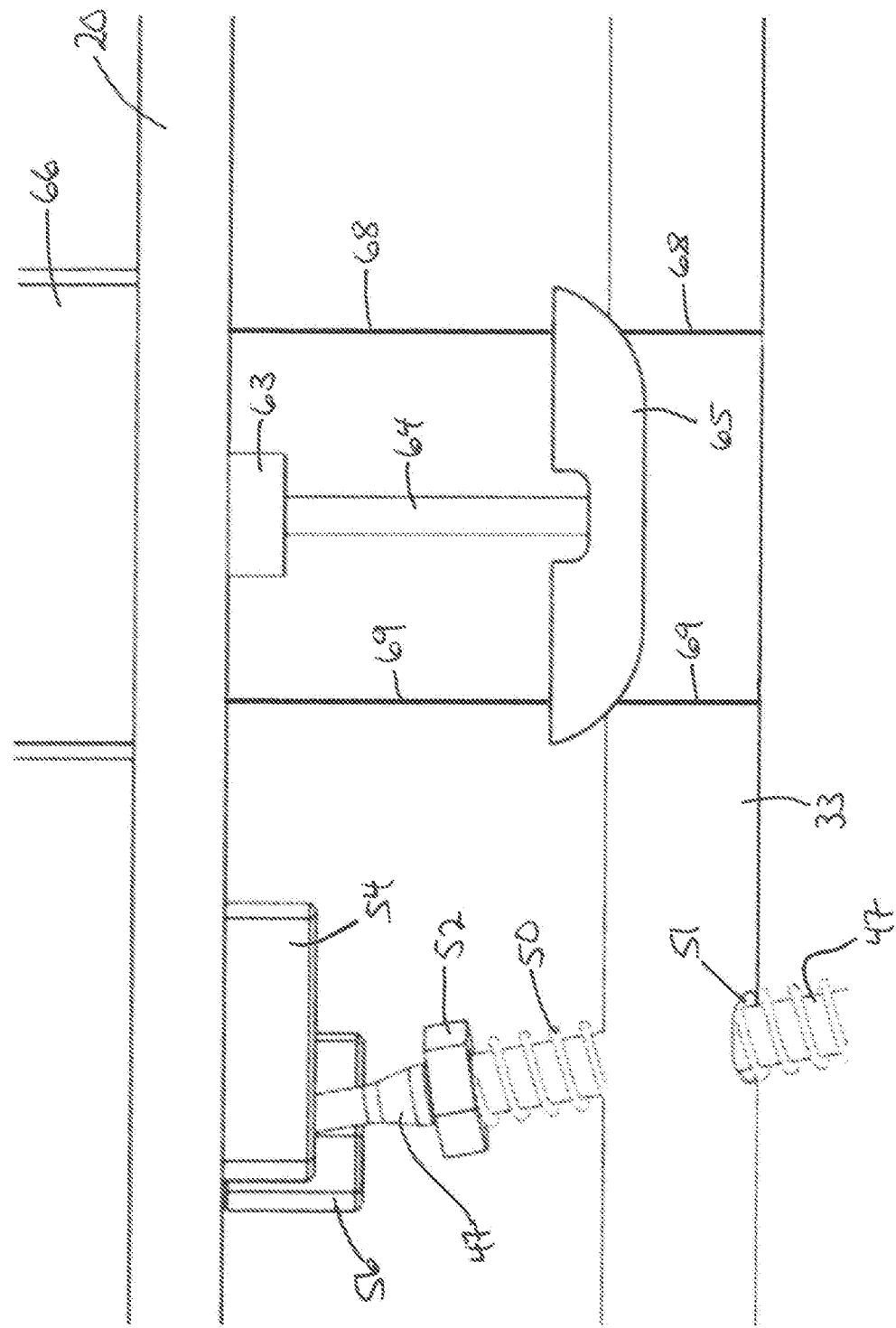

FIG. 12 shows the locking mechanism and the damping mechanism in FIGS. 9-10 seen from above.

Figure 13:
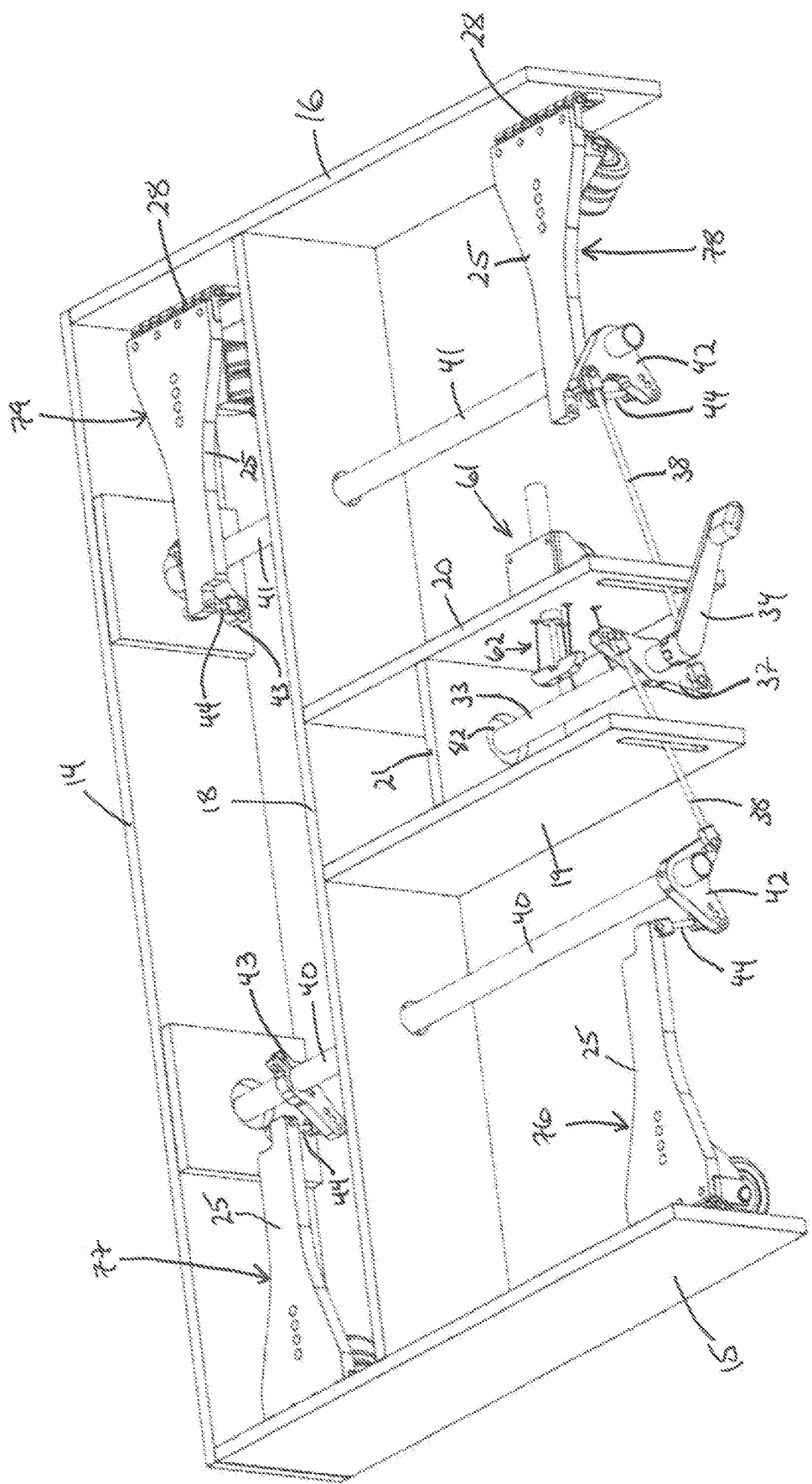

FIG. 13 shows an embodiment of the furniture base provided with a damping mechanism.

Figure 14:
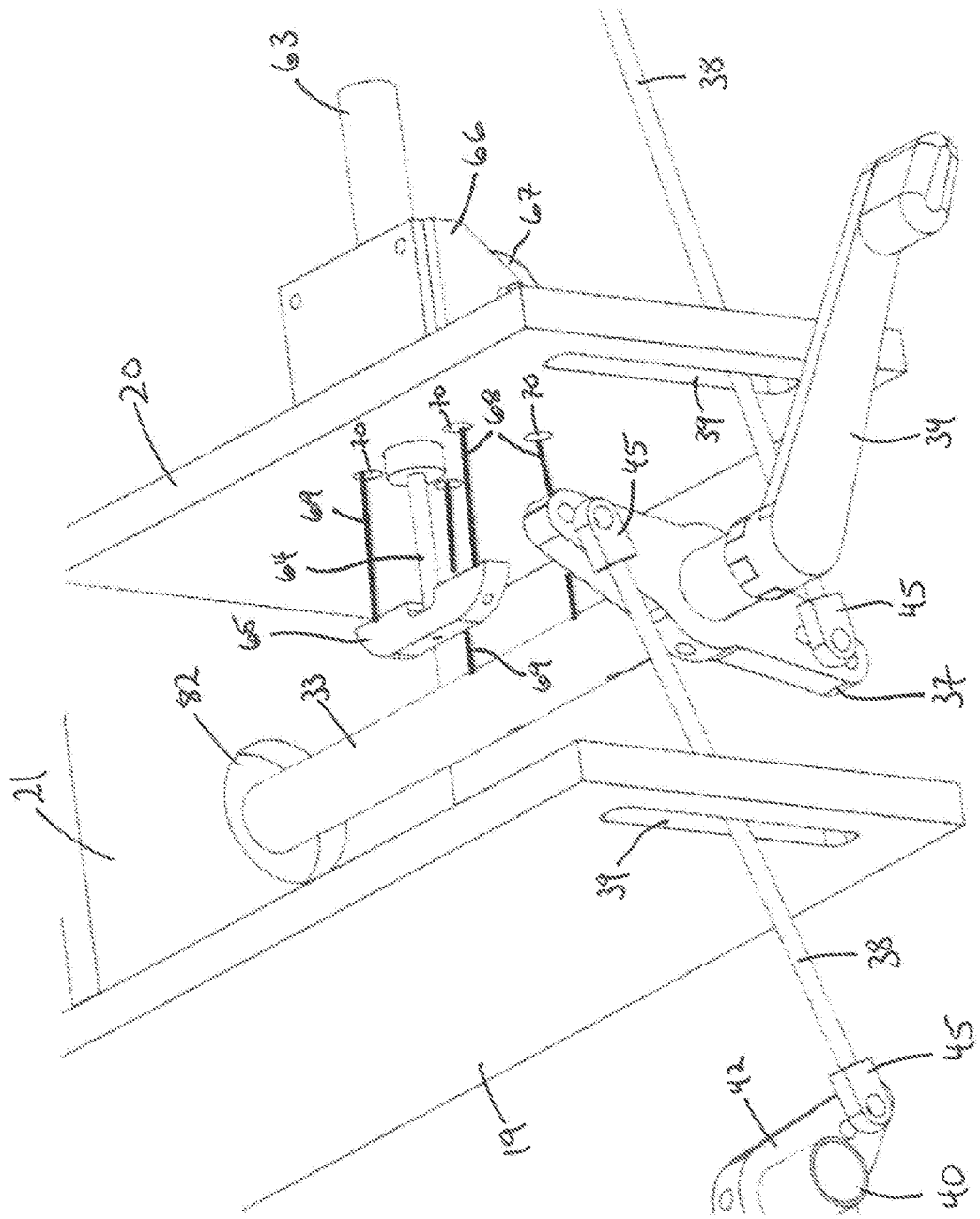

FIG. 14 shows an enlarged part of FIG. 13 that includes the damping mechanism.

Figure 15:
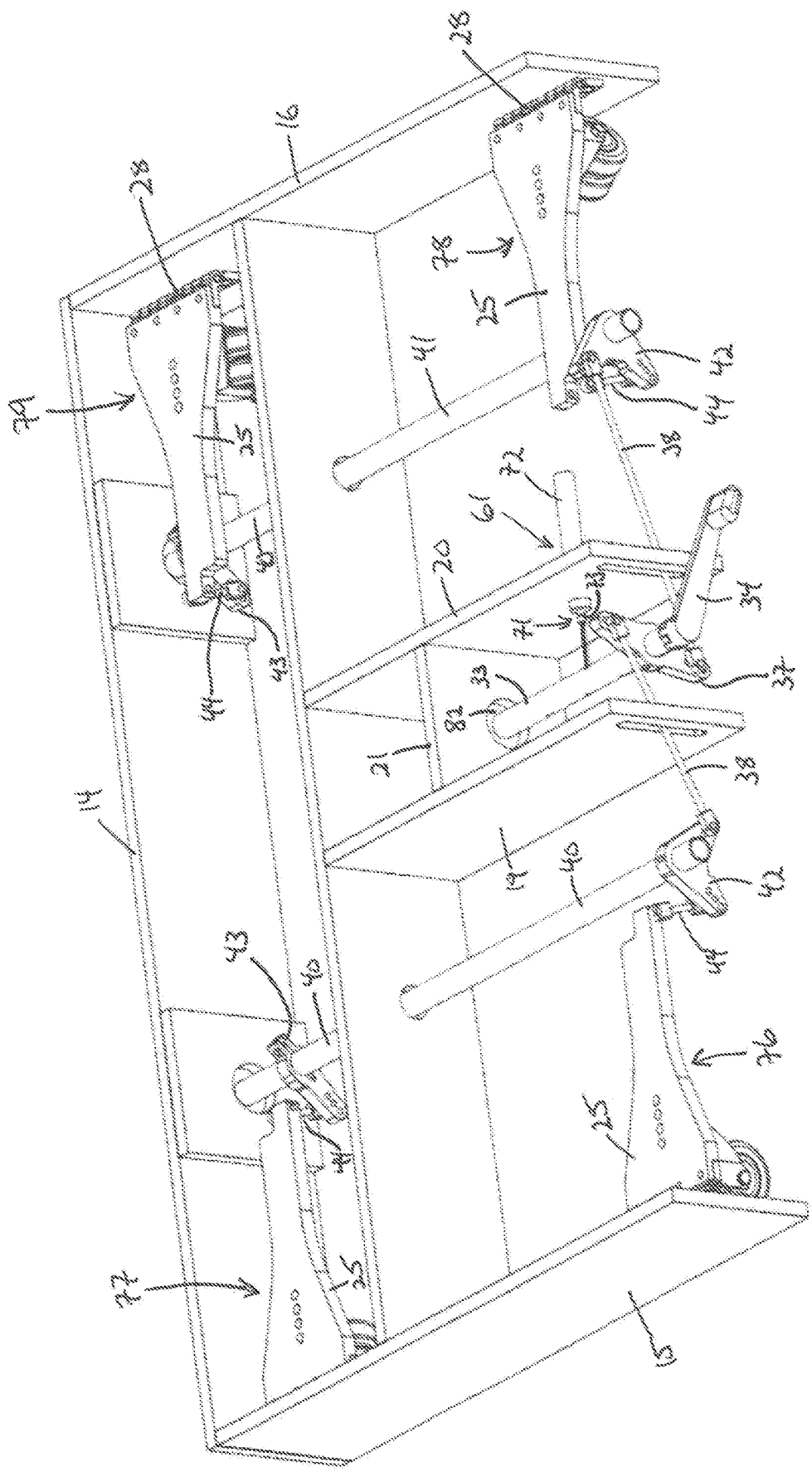

FIG. 15 shows an embodiment of the furniture base provided with an alternative embodiment of the damping mechanism.

Figure 16:
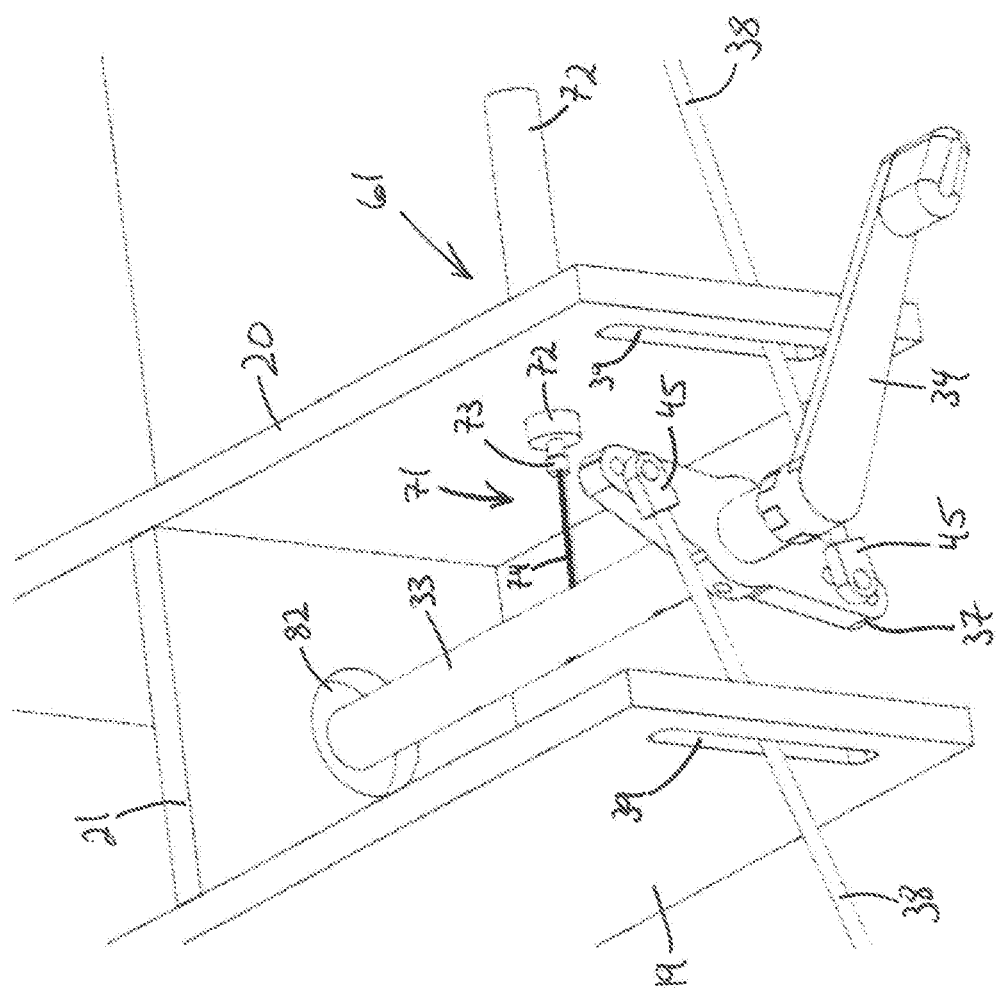

FIG. 16 shows an enlarged part of FIG. 15 that includes the alternative damping mechanism.

Figure 17:
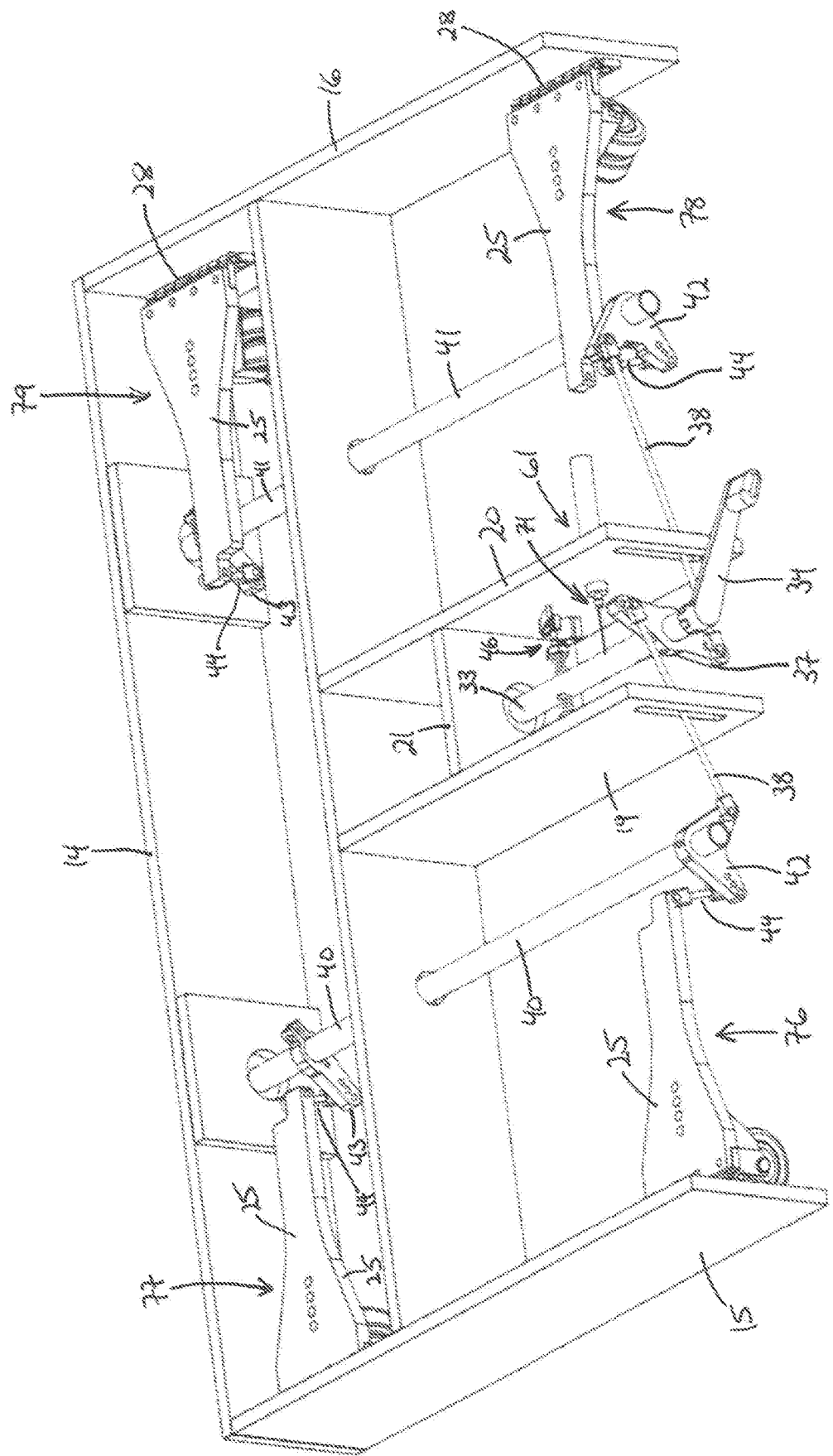

FIG. 17 shows an embodiment of the furniture base provided with the locking mechanism and the alternative damping mechanism.

Figure 18:
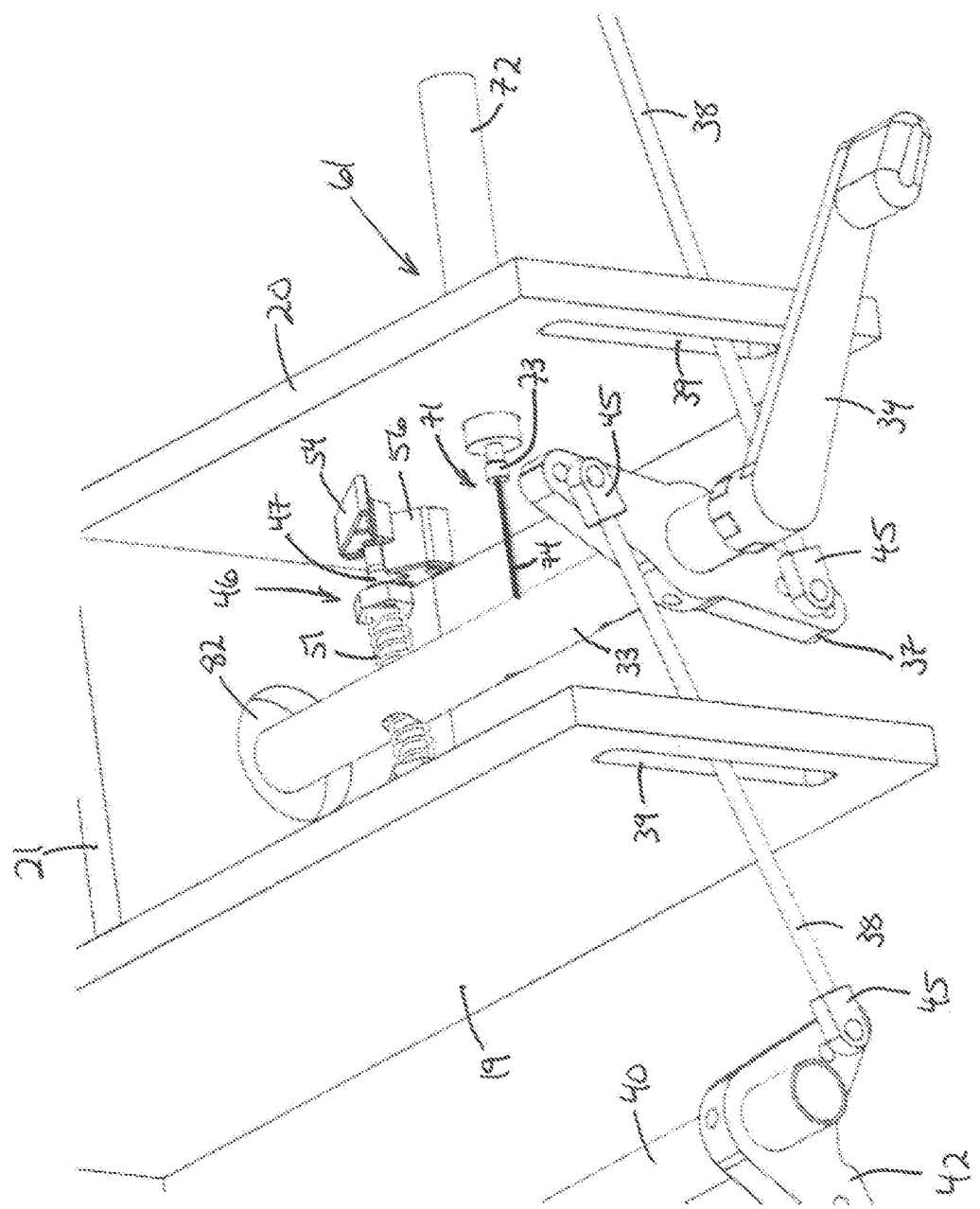

FIG. 18 shows an enlarged view of FIG. 17 that includes the locking mechanism and the alternative damping mechanism.

In the following slightly different variants of the present furniture base will be described. The various variants are, however, to a large degree equal and the same reference numbers are used on all figures for the same technical features that are equal.

Figure 1:
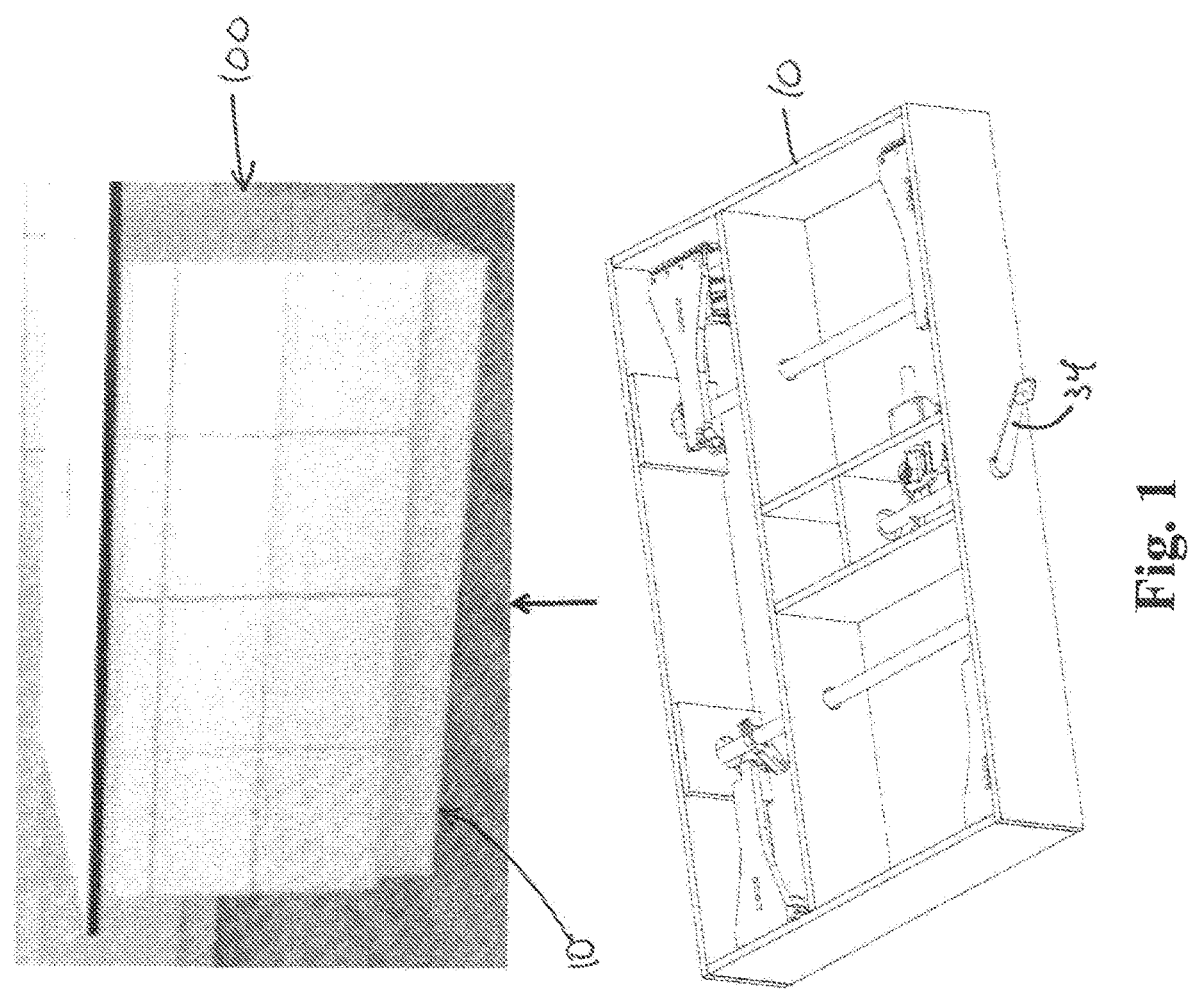
Figure 2:
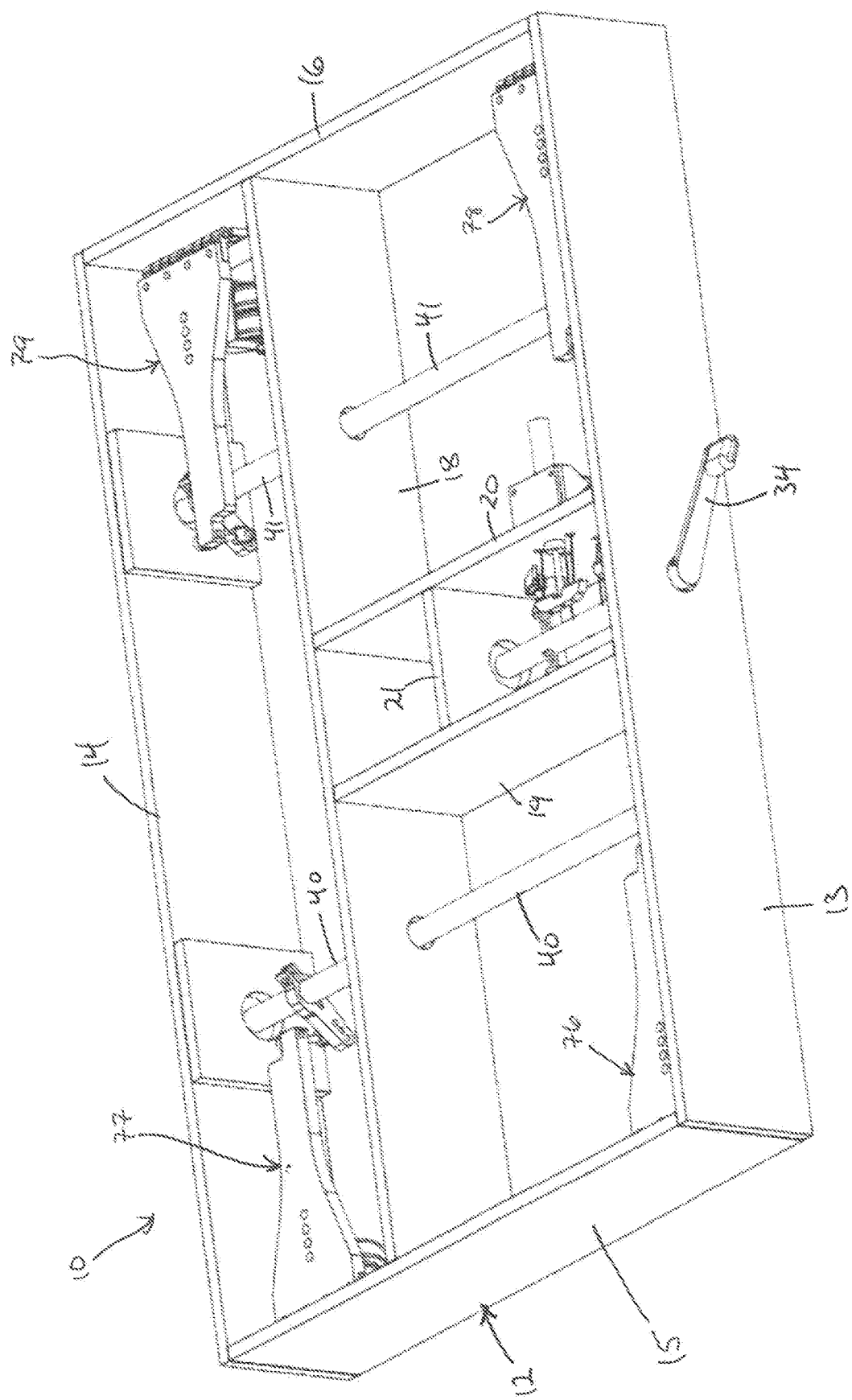
FIG. 2 shows an embodiment of a furniture base according to the present invention.

With reference to the figures and particularly FIGS. 2-4, there is shown a piece of furniture 100 in FIG. 1 that is provided with a furniture base 10 below the piece of furniture as indicated in the upper figure. The furniture base may be a separate part that is mounted to the piece of furniture, as indicated in FIG. 1, or it may be formed as an integral part of the piece of furniture 100. The piece of furniture is a piece of furniture that there is need, or a desire, for moving over a surface. The piece of furniture is typically relatively heavy and/or difficult to handle for a person and is therefore provided with wheels for movement of the piece of furniture. The piece of furniture may for example be a kitchen island, a cabinet, a bench or any other type of furniture that one may wish to move over a ground and where a stable piece of furniture is desired that can also be moved and the wheels kept hidden when the piece of furniture is placed in a desired position.

As shown in the figures, the furniture base 10 is provided with an actuator device 33 that is rotatably supported, for example with the help of suitable bearing devices, such as a ball-bearing (not shown in the figures) in a frame structure 12. The frame structure 12 comprises a front wall 13, a rear wall 14, a first side wall 15 and a second side wall 16 that together make up an outer frame of the furniture base 10. The frame structure 12 is further provided with the necessary internal walls, among other things to provide necessary stiffness of the frame structure and for mounting of necessary devices to the frame structure. In FIG. 2 there is shown that the frame structure may comprise a first partition wall 18 that extends between the two side walls 15, 16, and a second partition wall 19 and a third partition wall that both extend between the first partition wall 18 and the front wall 13, and a fourth partition wall 21 that extends between the second partition wall 19 and the third partition wall 20.

The actuator device 33 may, as indicated in the figures, be formed as shaft that is rotatably supported in the front wall 13 and in an attachment opening 82 in the fourth partition wall 21. The second, third and fourth partition walls 19, 20, 21 and the front wall 13 thereby delimit an actuator room where there is provided a locking mechanism 46 and/or a damping mechanism 61.

The actuator device 33 is provided with a detachable actuator element 34 as indicated in the figures. The actuator device and the actuator element 34 may be provided with correspondingly shaped tooth elements such that the actuator element 34 easily can be attached to the end of the actuator device 33. The actuator element 34 may have the shape of a pedal such that a person may step on the actuator element and thereby rotate the actuator device 33.

In each corner of the frame structure 12 there is a wheel unit 76, 77, 78, 79 rotatably attached to the frame structure 12, for example with a hinge device 28, such that the wheel units 76, 77, 78, 79 can be given a rotational movement relative to the frame structure 12.

The wheel units 76, 77, 78, 79 are formed the same way, and comprise a plate element 25 that is rotatably attached to the first side wall 15 or the second side wall 16 with the help of a hinge device 28. The wheel units 76, 77, 78, 79 further comprise a wheel element 29 that is rotatably supported to a support part 30. The support part 30 is rotatably attached to the underside of the plate element 25 with a swivel device 31 such that the support part 30 with the wheel element 29 are rotatable about an axis that is substantially perpendicular to the plate element 25. By rotating the plate element 25 the wheel 29 is moved between a lower position, where the wheel projects out from the frame structure 12 and is in contact with the surface of the ground such that the piece of furniture can be wheeled over the ground, and an upper position where the wheel 29 is lifted up and is positioned at the inside of the frame structure 12, i.e. that the piece of furniture 10 will stand on the ground, for example a floor.

In the frame structure 12 there is further provided a first intermediate shaft 40 and a second intermediate shaft 41 that are both rotatably supported in the frame structure 12 and extend from the front wall 13 to the rear wall 14.

On the actuator device 33 there is provided a first connecting element 37. On the first intermediate shaft and the second intermediate shaft 41 there is provided a second connecting element 42. Between the first connecting element 37 and each of the two second connecting elements 42 there is provided a first rod 38 that are both rotatably connected to both the first connecting element 37 and the second connecting element 42. The first rod 38 is passed through slot openings 39 in the second partition wall 19 and the third partition wall 20 respectively as indicated in the figures.

Further, between respective second connecting elements 42 on the first and second intermediate shafts 40, 41 and the plate element 25 of the respective wheel units 76, 78 there is provided a second shaft 44 where the second shafts 44 are rotatably attached to both respective plate elements 25 and respective second connecting elements 42 on the first and second intermediate shaft 40, 41.

Further there is attached a second connecting element 43 on the first intermediate shaft 40 and the second intermediate shaft 41 near the rear wall 14 of the frame structure and the wheel units 77, 79. Between respective third connecting elements 43 on the first and the second intermediate shaft 40, 41, and the plate element 25 of the respective wheel units 77, 79 there is also provided a second rod 44 where both the second rods 44 are rotatably attached to both respective plate element 25 and respective third connecting elements 43 on the first and second intermediate shaft 40, 41.

When the wheel units 76, 77, 78, 79 are in their respective upper positions, as shown in FIG. 4, and the actuator device is rotated, by a person treading on the actuator element 34, the plate elements 25 will thereby be pulled down and the frame structure 12 is lifted while the wheels 29 of the wheel units rest on the ground. The wheel units 76, 77, 78, 79 is thereby in their lower positions as shown in FIG. 3, and the piece of furniture 100 may be wheeled across the ground.

If the actuator device 33 is released when the wheel units 76, 77, 78, 79 are in their lower positions, the weight of the piece of furniture 100 will cause the wheel elements to be forced back to their upper positions. To avoid this, the furniture base 10 is preferably provided with a locking mechanism 46 that will lock the actuator device 33 in its position when the wheel units 76, 77, 78, 79 reach their lower positions, and that will release the actuator device 33 with another push on the actuator element 34 such that the furniture base 12 can be lowered down on the ground and the wheel units are moved to their upper positions because of the weight of the piece of furniture.

Figure 5:
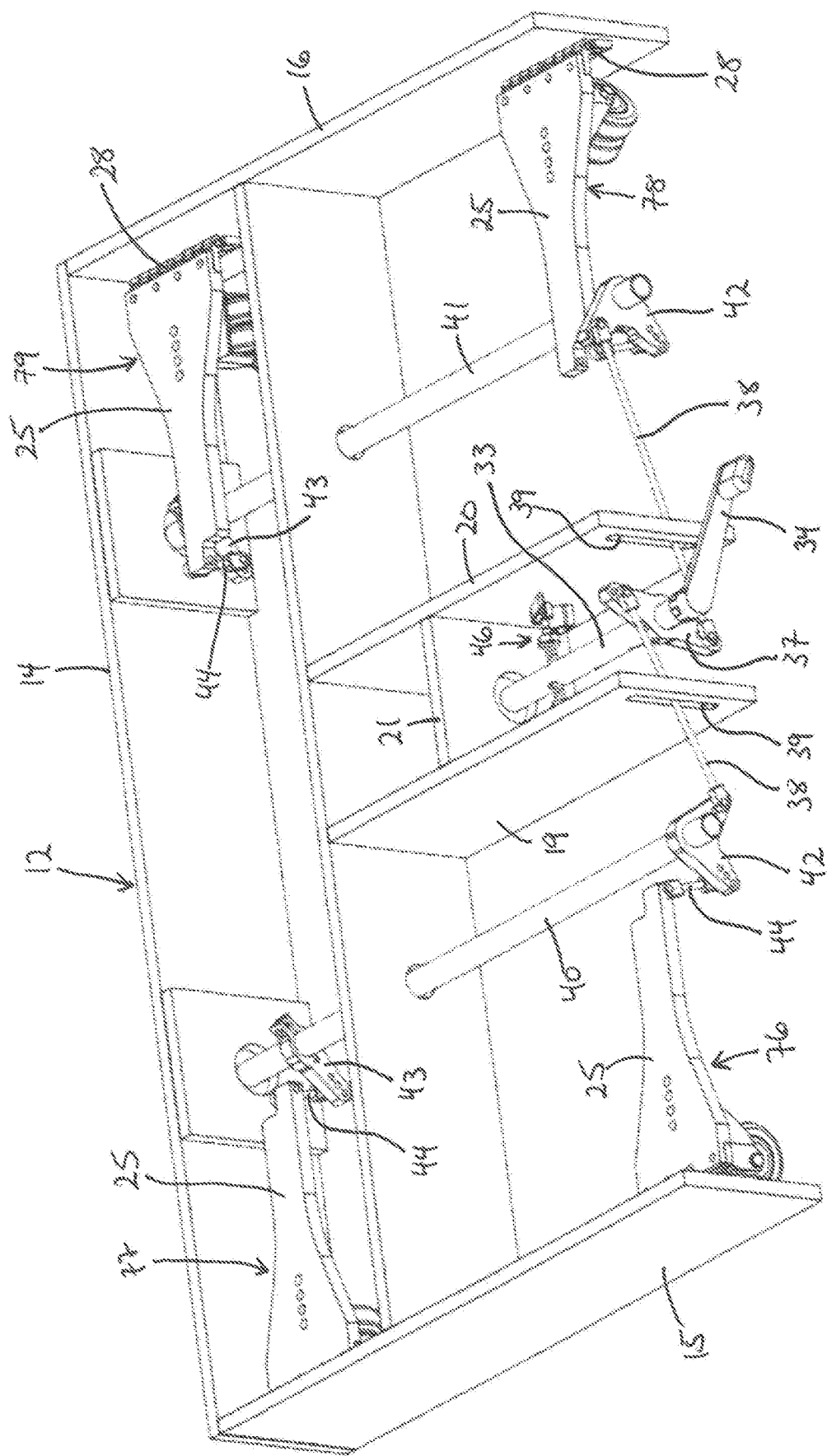
FIG. 5 shows an embodiment of the furniture base provided with a locking mechanism.

The furniture base 10 provided with a locking mechanism 46, is shown in a number of figures, among others FIG. 5. The locking mechanism is shown in more detail in FIGS. 6-7 and the mode of operation of the locking mechanism is shown in FIGS. 8a-8d.

The locking mechanism 46 comprises a guide pin 47 comprising a guide pin head 83 that is provided at one end of the guide pin 47, and an attachment nut 52 that is provided in the vicinity of the second end of the guide pin 47. The locking mechanism 46 further comprises a spring device 50 that preferably is bipartite and therefore comprises two spring device parts. The spring device 50 may alternatively be formed as a single spring device part that extend through a through-going attachment opening 51 in the actuator device 33. The spring device 50 surrounds the guide pin 47 and abuts the guide pin head 83 and the attachment nut 52.

If the spring device 50 is bipartite, the two spring device parts preferably abut the actuator device 33, i.e. the two spring device parts extend between and abut respectively the actuator device 33 and the attachment nut 52 and the actuator device 33 and the guide pin head 83.

If the spring device 50 is not bipartite, it will extend through the attachment opening 51 and abut the guide pin head 83 and the attachment nut 52. The spring device can alternatively be attached to the actuator device 33 in the attachment opening 51 if that is desirable.

The guide pin 47 extend through and is arranged in the attachment opening 51 in the actuator device 33 as indicated in the figures. The attachment opening 51 is through-going and has an oblong shape in the longitudinal, axial direction of the actuator device 33.

Preferably the attachment opening 51 has an oblong shape with the longest extension, i.e. the longest diameter, in the axial direction of the actuator device 33. That means that the attachment opening 51 is not circularly shaped, but that the attachment opening 51 has a radial extension in the axial direction of the actuator device that is larger than the radial extension of the attachment opening 51 in a direction perpendicular to the axial direction of the actuator device 33.

The attachment opening preferably has a larger extension in the axial direction of the actuator device 33 on the side of the actuator device 33 that faces the guide device 53 than on the opposite side of the actuator device 33.

If the actuator device 33 is formed without a bore in the axial direction that extend beyond the attachment opening 51, the attachment opening 51 is preferably formed with smooth and straight side faces through the actuator device 33 with a decreasing distance between opposite sides in the axial direction of the attachment opening 33 from the opening of the attachment opening 51 that faces the guide device 53 and towards the opening of the attachment opening 51 on the opposite side of the actuator device 33 relative to the guide device 53. This means that the attachment opening will have an oblong conical shape (with a cut-off top) in a vertical axial section through the actuator device 33 when the longitudinal axis of the attachment opening 51 lies horizontally. The guide pin 47 may be swingably supported in one or both of the two openings of the attachment opening 51.

As mentioned above, the actuator device 33 can be formed completely or partially hollow where the actuator device 33 at least is formed with a bore that extends from one side of the actuator device and at least beyond the attachment opening 51. The through-going attachment opening 51 for the guide pin 47 in the actuator device 33 comprises in this case in practice two oblong holes in the axial direction of the actuator device 33, one oblong hole that extend from the outside of the outer side of the actuator device 33 that faces the guide device 53 and into the axial bore in the actuator device 33, and a hole that extend from the outside of opposite side of the actuator device 33 relative to the guide device 53 and into the axial bore in the actuator device 33.

The oblong hole in the actuator device that faces the guide device 53 preferably has a larger extension in the axial direction of the actuator device 33 than the oblong hole in the actuator device 33 on the opposite side of the actuator device 33 relative to the guide device 53. The guide pin 47 is swingably supported in at least one of the two holes, but is preferably swingably supported in both holes.

The guide pin 47 is mounted in the attachment opening 51 such that the guide pin 47 is swingable about an axis that preferably is arranged at 90 degrees to the rotational axis of the actuator device 33 (which in substantially is co-axial with the longitudinal axis of the actuator device) and in a plane that is substantially parallel to the rotational axis of the actuator device 33.

The spring device 50 that is arranged around the guide pin 47 contributes to the guide pin being subjected to a force from the spring device 50 as soon as the guide pin 50 is moved out of its position of equilibrium that seeks to bring the guide pin 47 back to the position of equilibrium.

The guide pin 47 can thus be rotated (or pivoted) up and down by rotating the actuator device 33, and swung back and forth about its position of equilibrium about an axis that makes an angle of substantially 90 degrees with the rotational axis of the actuator device 33.

The locking device 46 further comprises a guide device 53 that is adapted to guide the guide pin 47 when the actuator device 33 is rotated, and lock the guide pin 47 for further movement when it is in a position where the wheel units 76, 77, 78, 79 is moved towards and is in their respective lower positions.

Figure 7:
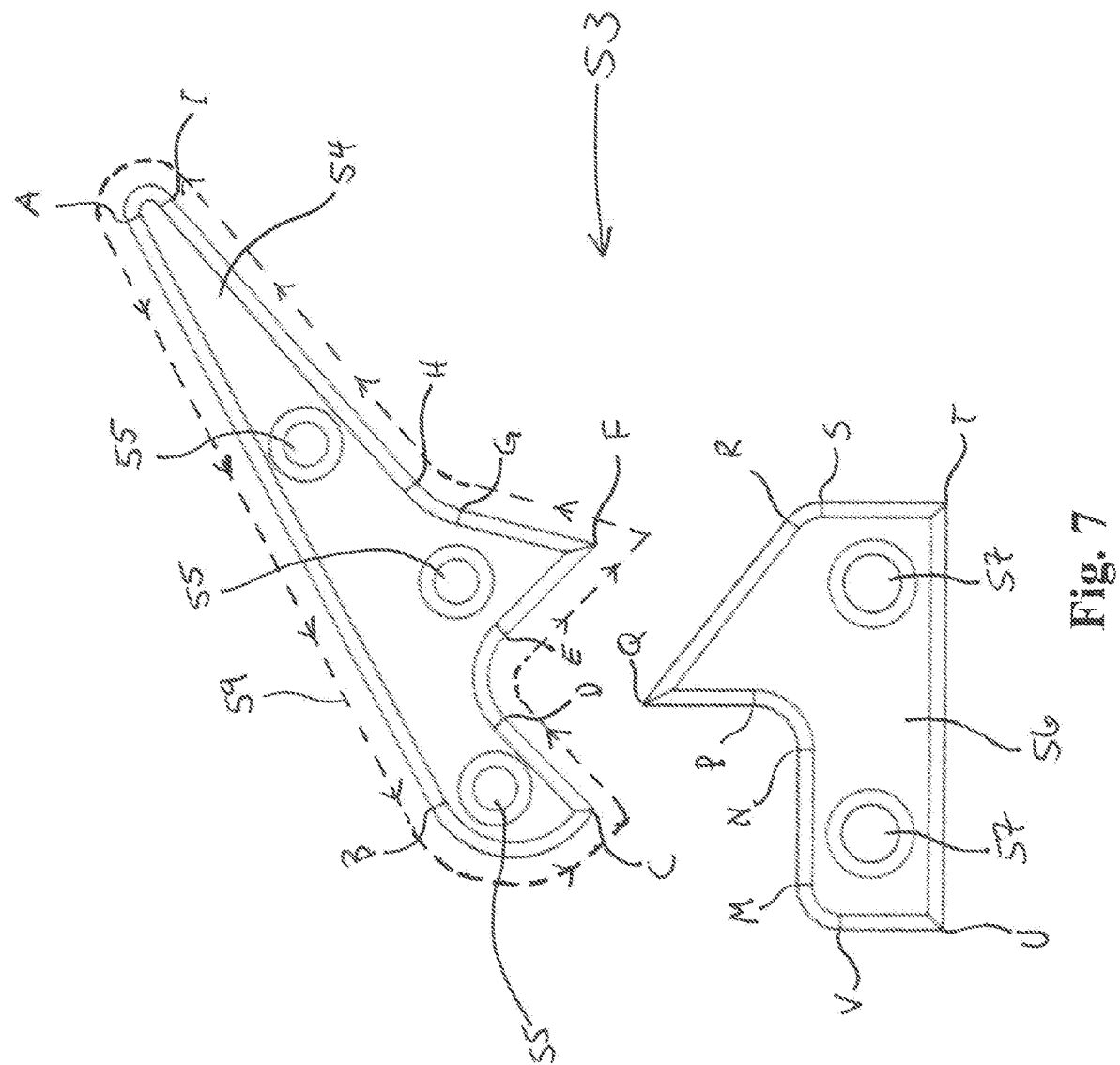
FIG. 7 shows the guide device of the locking mechanism.

The guide device is shown in detail in FIG. 7 and comprises a first guide element 54 and a second guide element 56. The first guide element 54 can be attached to the frame structure 12, in this case the third partition wall 20 as shown in the figures, with screws or bolts that are passed through the fastening holes 55. The second guide element 56 can in a similar way be attached to the frame structure 12, in this case the third partition wall 20, with screws or bolts that are passed through the bolt holes 57. An alternative would be use a plate that the first and second guide elements 54, 56 are mounted to, and to attach the plate to the frame structure 12. A further alternative would be to form the plate and the two guide elements 54, 56 in a single part that is attached to the frame structure 12.

The distance between the actuator device 33 and the guide device 53 is set so that the guide pin 47 can move around the first guide element 54 in a path that can be approximately as the one that is indicated with the broken line in FIG. 7, and be guided by the first guide element 54 and the second guide element 56 as the guide pin 47 is moved around the first guide element 54.

The attachment opening 51 is preferably provided in a position in the actuator device 33 such that the guide pin 47 that is arranged in the attachment opening 51 points against a region delimited by a vertical line through point F and a vertical line through point I (see FIG. 7) when the guide pin 47 is in its position of equilibrium. Further, the attachment opening 51 is adapted so that when the wheel units 76, 77, 78, 79 are in their respective upper positions, i.e. the furniture base rests on the ground, the guide pin 47 will lie on the upper side of the surface AB of the first guide element 54.

Figure 8B:
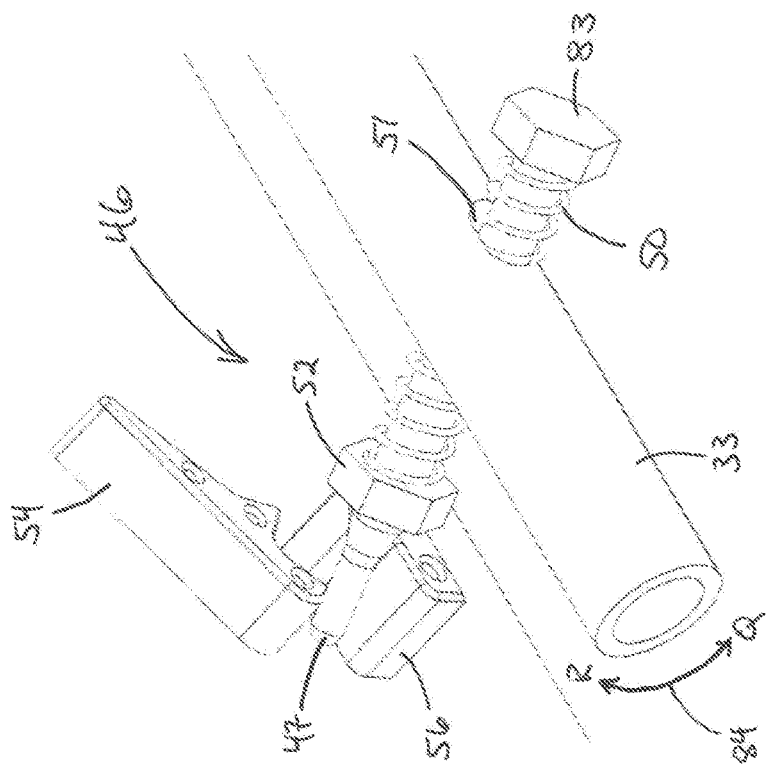
Figure 8A:
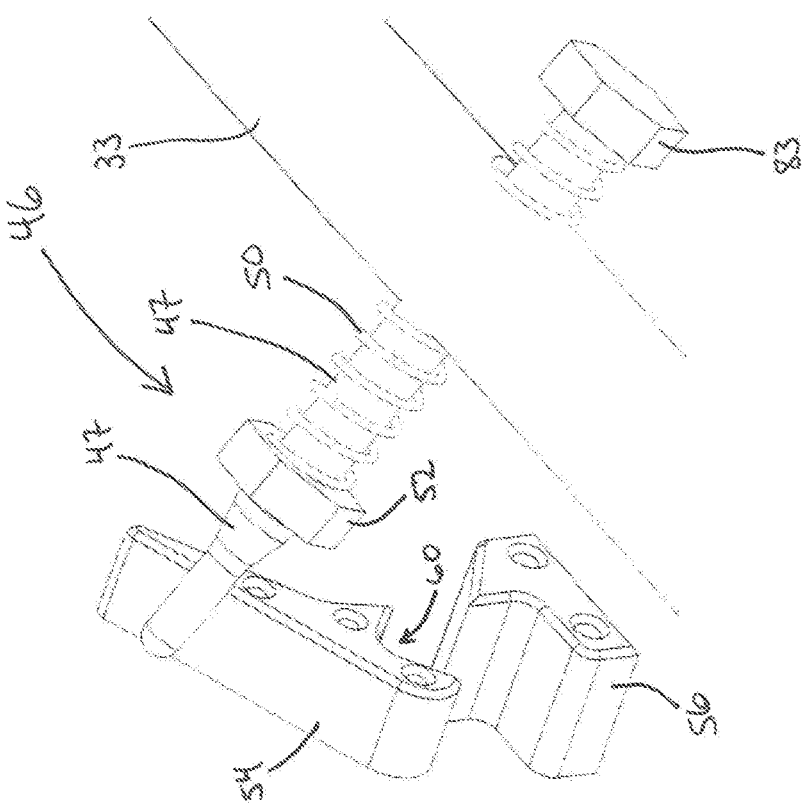
Figure 8D:
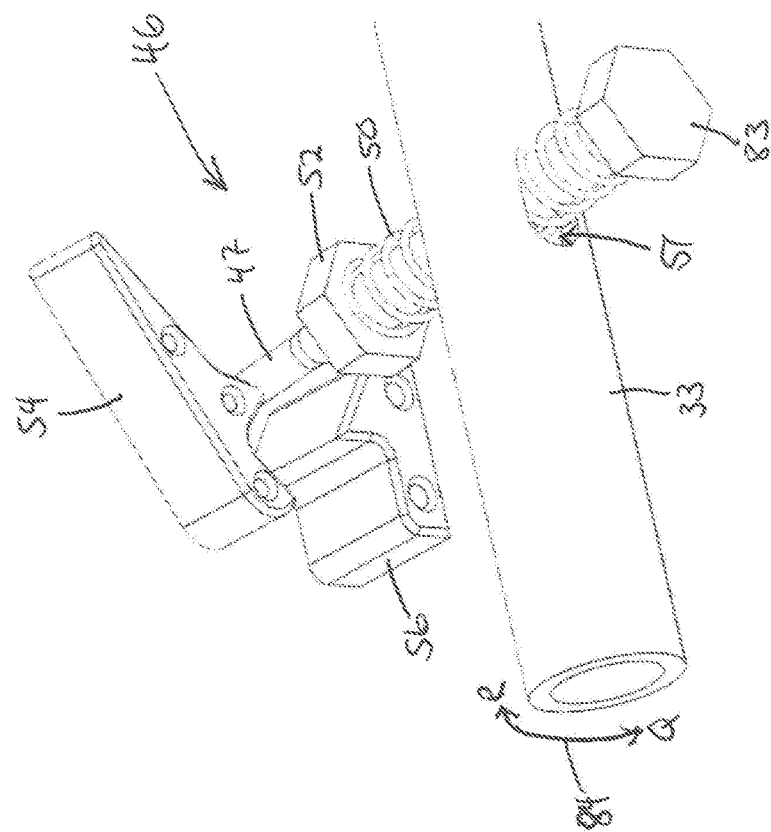
Figure 8C:
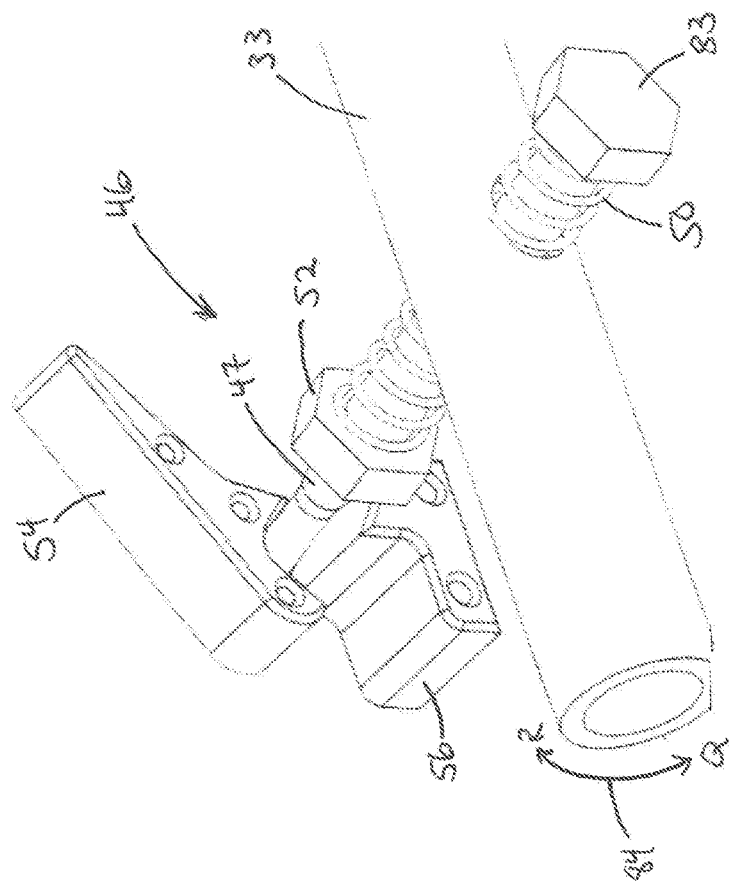

With reference to FIGS. 8a-8d and 7 the mode of operation of the locking mechanism can now be explained. The starting position of the guide pin 47 is shown in FIG. 8a where the guide pin abuts the surface AB on the first guide element 54. This surface is inclined downwards such that when the actuator device is rotated in direction Q, as indicated with on the rotational direction arrow 84, to move the wheel units 76, 77, 78, 79 from their respective upper positions to their respective lower positions, i.e. the furniture base 10 and the piece of furniture 100 is lifted from the ground on which they are placed, the guide pin 47 is forced to move downwards. Since the surface AB is inclined, the guide pin will at the same time be forces out of its position of equilibrium. After the guide pin 47 has moved along the surface AB, it will move along the surface BC until it reaches its outermost point of the swing movement just before point C. On further rotation of the actuator device 33, the guide pin will start to swing back towards the position of equilibrium due to the spring force from the spring device 50 and when the guide pin is rotated so far down that it is below point C, it will swing back towards the position of equilibrium and move into a locking portion 60 on the first guide element 54 that is formed by the surface CDEF. The locking portion 60 has a convex, curved shape and is shown in the figures with a generally wide, upside-down U-shape. To ensure that the guide pin is guided into the locking portion 60 and that it does not jump over the locking portion, the second guide element 56 is provided with an upward projecting part PQ that the guide pin can bump against and thereafter be guided up into the locking portion 60.

When the guide pin is in the locking portion 60, the rotation of the actuator device 33 in the direction Q, i.e. the downward directed movement of the actuator element 34, will be completed. When a person now removes the force on the actuator element 34, the weight of the furniture base 10 and the piece of furniture 100 will try to force the wheel units 76, 77, 78, 79 back to their respective upper positions. This is only possible by rotating the actuator device 33 in direction R as indicated in the figures, i.e. that the guide pin must be moved upwards. The guide pin 47 is, however, in the locking portion 60 and prevents therefore that the actuator device 33 can be rotated. The wheel units 76, 77, 78, 79 are therefore locked in their lower positions and the piece of furniture 100 can be wheeled over the ground to the desired position.

When the piece of furniture 100 is in the desired position and it is desired to let the piece of furniture rest on the furniture base on the ground, the actuator element is again pressed downwards by a user such that the actuator device 33 is rotated. The guide pin 47 will then move along the surface EF because the spring force on the guide pin still seeks to move the guide pin towards the position of equilibrium that is positioned between the points F and I as explained above. The surface QR on the second guide element 56 will act as an extra guide that guides the guide pin 47 in the correct direction (towards the right in the figures). When the guide pin passes the point F on the first guide element 54, the guide pin 47 will move towards the position of equilibrium between F and I. When the furniture base is lowered further, i.e. the actuator device is rotated in direction R, the guide pin 47 will be forced to follow the surface FGHI and thereby be swung out of its position of equilibrium again until the guide pin passes the outermost point on the surface IA where the spring force that acts on the guide pin again will move the guide pin 47 towards the position of equilibrium. When the furniture base is lowered down on the ground, the guide pin 47 is again positioned along the surface AB in the position of equilibrium in the region between a vertical line through F and a vertical line through I.

In those cases where the piece of furniture is heavy, it can be desirable to damp the movement downwards as the wheel units 76, 77, 78, 79 are moved from their respective lower positions to their respective upper positions. The furniture base 10 can therefore be provided with a damping mechanism 61 that damps this movement.

Several variants of a damping mechanism 61 will be described with reference to particularly FIGS. 6, 9-12 and 15-18, but a damping mechanism is also shown in several other figures.

On FIGS. 9-12 there is shown a damping device 61 with a first damping device 62. The first damping device 62 comprises a cylinder part 63 that is mounted to the frame structure 12 and/or a support element 66 that is mounted to the frame structure 12, for example to the third partition wall 20 as indicated in the figures.

In the cylinder part 63 there is provided a piston element 64 that is movable in the cylinder part 63. The cylinder part 63 and the piston element 64 together form a conventional damping device that will not be further explained here. An attachment part 65 is mounted to the piston element 64 on the outside of the cylinder part 63, preferably at the end of the piston element 64.

The damping mechanism 61 further comprises two wire pulleys 67 that are mounted to the support element 66 or the frame structure 12. A first wire 68 and a second wire 69 is further attached to the attachment part 65 at one end, passed through respective wire openings 70 and over respective wire pulleys 67 and thereafter passed back through respective wire openings 70 to the actuator element 33 where the first wire 68 and the second wire 69 are attached. The wire is attached to the actuator device 33 such that the wires 68, 69 are pulled towards and is rolled up on the actuator device 33 as the wheel units 76, 77, 78, 79 are moved from their respective lower positions to their respective upper positions, i.e. the piece of furniture is lowered and the actuator device is rotated in the direction R as explained above.

When the wires are pulled towards the actuator device 33, the piston element 64 will also be pushed into the cylinder part 63 and thereby damps the rotational movement of the actuator device 33 and thereby the movement of the wheel units 76, 77, 78, 79 from their lower positions to their upper positions. Therewith, a damped and soft movement of the piece of furniture is achieved when it is lowered down on the ground.

As shown in the figures the wire pulleys 67 are mounted to the support element 66, but they may of course be mounted directly to the frame structure 12, both on the same side of the third partition wall 20 as the support element 66 or on the opposite side of the third partition wall if there is space for it.

In FIGS. 15-18 there is shown an alternative embodiment of a damping mechanism 61 with a second damping device 71. The damping device 71 comprises a cylinder part 72 that is mounted to the frame structure 12, for example the third partition wall as indicated in the figures. In the cylinder part 72 there is provided a piston element 73 that is movable arranged in the cylinder part. The cylinder part 72 and the piston element 73 together form a conventional piston/cylinder-damping device that will not be further explained here.

To the piston element 73 there is attached a wire 74 that extend to and is attached to the actuator device 33 in such a way that when the actuator device 33 is rotated in a direction R and the wheel elements 76, 77, 78, 79 are moved from their respective lower positions to their respective upper positions, and the piece of furniture 100 thereby is lowered onto the ground as explained above, the wire will be pulled towards rolled up on the actuator device 33. Therewith the piston element 73 is pulled out of the cylinder part 72 and a damping effect is achieved as the piece of furniture 100 is lowered onto the ground.

It could be mentioned that the piston/cylinder-dampers are differently arranged in the two embodiments that are explained above. In the first damping device 62 the damping effect is achieved when the piston element 64 is pushed into the cylinder part 63, while in the second damping device 71 the damping effect is achieved when the piston element 73 is pulled out of the cylinder part 72.

It should further be mentioned that present furniture base may comprise various configurations of the locking mechanism 64 and the damping mechanism 71.

In FIGS. 1-4, 9-12 and 17-18 there are shown embodiments of the present furniture base that comprises both a locking mechanism 64 and a damping mechanism 61.

In FIGS. 1-4, 9-12 and 17-18 there are shown embodiments of the present furniture base 10 that comprises both a locking mechanism 64 and a damping mechanism 61.

In FIGS. 1-4 and 9-12 there are shown embodiments of the furniture base 10 that comprises the locking mechanism 64 and the first damping device 62.

In FIGS. 17-18 there is shown an embodiment of the furniture base 10 that comprises the locking mechanism 64 and the second damping device 62.

Figure 6:
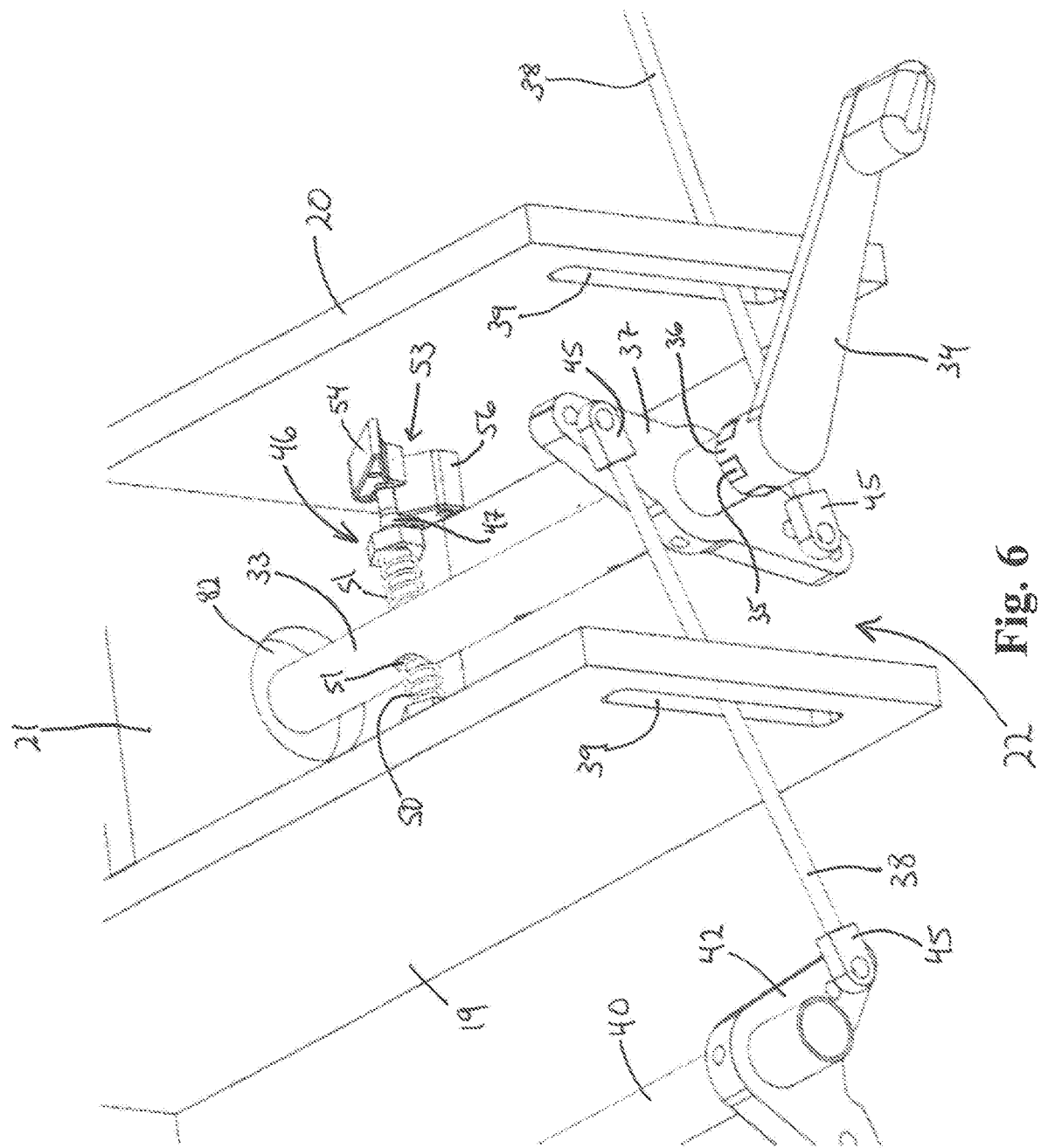
FIG. 6 shows an enlarged part of FIG. 5 that includes the locking mechanism.

In FIGS. 5-6 there is shown an embodiment of the furniture base 10 that comprises the locking mechanism 64 only.

In FIGS. 13-16 there is shown an embodiment of the furniture base 10 that comprises a damping mechanism 61 only.

In FIGS. 13-14 there is shown an embodiment of the furniture base 10 that comprises the first damping device 62 only.

In FIGS. 15-16 there is shown an embodiment of the furniture base 10 that comprises the second damping device 71 only.

The present furniture base that has been described herein, may of course be used with or be integrated in all different types of furniture, but may also be used with or integrated into other types of devices that one wish to alternately move across a ground and keep steady on the ground. For example the furniture base may be used together with workshop machines and other machines, work tables, toolboxes, hospital beds, operation tables, and other types of equipment for which it is desirable or is a need to be moved across a ground.

The invention has now been described with reference to a non-limiting embodiment of the invention. A person skilled in the art would, however, understand that the invention, as it is described above and shown in the figures, may be modified and that changes may made within the scope of the invention as defined in the patent claims.

The invention claimed is:

1. A furniture base comprising a frame structure and an actuator device that is rotatably supported in the frame structure about a rotational axis, which furniture base further comprises a plurality of wheel units that are movably attached to the frame structure between an upper position and lower position relative to the frame structure, which wheel units are connected to the actuator device for movement of the wheel unit between the upper and lower position, the furniture base further comprising a locking mechanism for locking of the wheel units in the lower position of the wheel units, which locking mechanism comprises a guide pin that projects out from the actuator device and is attached to the actuator device swingably relative to the actuator device, which furniture base further comprises a guide device that guides the movement of the guide pin when the actuator device is rotated for movement of the wheel units between the upper and lower positions of the wheel units.

2. A furniture base according to claim 1,
wherein the actuator device is rotatable about a rotational axis that is co-axial with an axis of the actuator device in the longitudinal direction.

3. A furniture base according to claim 1,
wherein the guide pin is swingably mounted to the actuator device in a plane that is substantially parallel to the rotational axis of the actuator device.

4. A furniture base according to one of the claim 1,
wherein the actuator device comprises a through-going attachment opening in which the guide pin is swingably mounted.

5. A furniture base according to claim 4,
wherein the locking mechanism comprises a spring device that is arranged against the attachment opening and that is biased to bring the guide pin to a starting position.

6. A furniture base according to one of the claim 1,
wherein the guide device comprises a first guide element that is provided with a locking portion, and that the guide pin is locked for further movement when it engages with the locking portion, whereby the wheel units are locked in their respective lower positions.

7. A furniture base according to one of the claim 1,
wherein the guide device further comprises a second guide element to ensure that the guide pin is guided into engagement with the locking portion when the actuator device is rotated in order to move the wheel units to their lower positions.

8. A furniture base according to one of the claim 1, characterized in that the furniture base further comprises a damping mechanism for damping of the movement of the furniture base, and the piece of furniture, as the wheel units move from their respective lower positions to their respective upper positions.

9. A furniture base according to claim 8,
wherein the damping device is attached to the actuator device and to the frame structure.

10. A furniture base according to claim 8,
wherein the damping mechanism comprises a piston/cylinder-damper in order to provide the damping effect.

11. A furniture base according to claim 8,
wherein the damping mechanism comprises a damping device comprising a piston element that is arranged in a cylinder part that is attached to the frame structure, which piston element is connected to the actuator device with at least one wire or a rigid rod.

12. A furniture base according to claim 11,
wherein the damping device comprises an attachment part that is attached to the piston element, and a first wire and a second wire that are both attached to the attachment part and the actuator device and that run over respective wire pulleys that are attached to the damper device.

13. A piece of furniture that is movable over a surface, which piece of furniture comprises a furniture base according to claim 1.

14. A piece of furniture according to claim 13,
wherein the piece of furniture and the furniture base are separate parts.

15. A piece of furniture according to claim 13,
wherein the furniture base is an integral part of the piece of furniture.

16. A furniture base comprising a frame structure and an actuator device that is rotatably supported in the frame structure about a rotational axis, which furniture base further comprises a plurality of wheel units that are movably attached to the frame structure between an upper position and lower position relative to the frame structure, which wheel units are connected to the actuator device for movement of the wheel unit between the upper and lower position, the furniture base comprising a locking mechanism for locking of the wheel units in the lower position of the wheel units, which locking mechanism comprises a guide pin that projects out from the actuator device and is attached to the actuator device swingably relative to the actuator device, which furniture base further comprises a guide device that guides the movement of the guide pin when the actuator device is rotated for movement of the wheel units between the upper and lower positions of the wheel units, the furniture base further comprising a damping mechanism for damping of the movement of the furniture base as the wheel units move from their respective lower positions to their respective upper positions.

17. A furniture base according to claim 16,
wherein the damping device is attached to the actuator device and to the frame structure.

18. A furniture base according to claim 16,
wherein the damping mechanism comprises a piston/cylinder-damper in order to provide the damping effect.

19. A furniture base according to claim 16,
wherein the damping mechanism comprises a damping device comprising a piston element that is arranged in a cylinder part that is attached to the frame structure, which piston element is connected to the actuator device with at least one wire or a rigid rod.

20. A furniture base according to claim 16,
wherein the damping device comprises an attachment part that is attached to the piston element, and a first wire and a second wire that are both attached to the attachment part and the actuator device and that run over respective wire pulleys that are attached to the damper device.

21. A furniture base according to claim 16,
wherein the actuator device is rotatable about a rotational axis that is co-axial with an axis of the actuator device in the longitudinal direction.
22. A furniture base according to claim 16,
wherein the guide pin is swingably mounted to the actuator device in a plane that is substantially parallel to the rotational axis of the actuator device.
23. A furniture base according to claim 16,
wherein the actuator device comprises a through-going attachment opening in which the guide pin is swingably mounted.
24. A furniture base according to claim 23,
wherein the locking mechanism comprises a spring device that is arranged against the attachment opening and that is biased to bring the guide pin to a starting position.
25. A furniture base according to claim 16,
wherein the guide device comprises a first guide element that is provided with a locking portion, and that the guide pin is locked for further movement when it engages with the locking portion, whereby the wheel units are locked in their respective lower positions.
26. A piece of furniture that is movable over a surface, which piece of furniture comprises a furniture base according to claim 16.
27. A piece of furniture according to claim 26,
wherein the piece of furniture and the furniture base are separate parts.
28. A piece of furniture according to claim 26,
wherein the furniture base is an integral part of the piece of furniture.

* * * * *